(12) United States Patent
Abe

(10) Patent No.: US 7,594,051 B2
(45) Date of Patent: Sep. 22, 2009

(54) STORAGE APPARATUS

(75) Inventor: Tetsuya Abe, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 11/121,012

(22) Filed: May 4, 2005

(65) Prior Publication Data

US 2006/0206640 A1    Sep. 14, 2006

(30) Foreign Application Priority Data

Mar. 9, 2005    (JP) .............................. 2005-065034

(51) Int. Cl.
| | |
|---|---|
| G06F 13/12 | (2006.01) |
| G06F 13/38 | (2006.01) |
| G06F 12/00 | (2006.01) |
| G06F 7/02 | (2006.01) |
| G11C 29/00 | (2006.01) |

(52) U.S. Cl. ......................... 710/68; 711/114; 714/805; 714/819

(58) Field of Classification Search .................... 710/68
See application file for complete search history.

(56) References Cited

U.S. PATENT DOCUMENTS

| | | | | |
|---|---|---|---|---|
| 5,185,748 A | * | 2/1993 | Fujimura | 714/820 |
| 5,255,270 A | * | 10/1993 | Yanai et al. | 714/710 |
| 5,655,150 A | * | 8/1997 | Matsumoto et al. | 710/17 |
| 5,986,835 A | * | 11/1999 | Tanaka et al. | 360/53 |
| 6,065,094 A | * | 5/2000 | Akiyama | 711/112 |
| 6,475,089 B1 | * | 11/2002 | Lee | 463/40 |
| 7,111,169 B2 | * | 9/2006 | Ripley et al. | 713/176 |
| 7,162,575 B2 | * | 1/2007 | Dalal et al. | 711/112 |
| 7,188,230 B2 | * | 3/2007 | Osaki | 711/216 |
| 2002/0131505 A1 | * | 9/2002 | Vidunas | 375/240.19 |
| 2003/0167439 A1 | * | 9/2003 | Talagala et al. | 714/770 |
| 2006/0107096 A1 | * | 5/2006 | Findleton et al. | 714/6 |

FOREIGN PATENT DOCUMENTS

JP    2001-111431    4/2001

* cited by examiner

*Primary Examiner*—Alford W Kindred
*Assistant Examiner*—Zachary K Huson
(74) *Attorney, Agent, or Firm*—Antonelli, Terry, Stout & Kraus, LLP.

(57) ABSTRACT

The storage apparatus is provided with a host interface adapter unit, a storage interface adapter unit, a cache memory unit storing data temporarily, a switch unit connecting the host interface adapter unit, the storage interface adapter unit, and the cache memory unit, a compressed data circuit unit producing compressed data based upon writing data into the physical storing device, and a compressed data saving unit saving compressed data produced in the compressed data circuit unit, where the compressed data circuit unit compressed reading data at a reading time of the data from the physical storing device, and compares the compressed data with compressed data corresponding to reading data saved in the compressed data saving unit with each other, and detects data rigging.

12 Claims, 22 Drawing Sheets

FIG. 10

MANAGEMENT TABLE

| LOGIC DEVICE ID | LUN | PORT ID | COLLATING AND SAVING DATA ID | NUMBER OF RESTORATIONS |
|---|---|---|---|---|
| A | 0001h | 01h | S002 | 0 |
| B | 0002h | 01h | T001 | 0 |
| B | 0003h | 02h | T002 | 1 |
| C | 0004h | 03h | T003 | 0 |
| . | . | . | . | . |
| . | . | . | . | . |
| . | . | . | . | . |
| . | . | . | . | . |

FIG. 11

COLLATING AND SAVING DATA FORMAT

| COLLATION AND PRESERVATION DATA ID | DATE | GENERATION NO. | DATA LENGTH | ATTRIBUTE |
|---|---|---|---|---|
| COMPRESSED DATA 1 | | | | |
| COLLATION AND PRESERVATION DATA ID | DATE | GENERATION NO. | DATA LENGTH | ATTRIBUTE |
| COMPRESSED DATA 2 | | | | |
| COLLATION AND PRESERVATION DATA ID | DATE | GENERATION NO. | DATA LENGTH | ATTRIBUTE |
| COMPRESSED DATA 3 | | | | |
| . . . | | | | |

STORAGE APPARATUS

CROSS-REFERENCE TO RELATED APPLICATION

The present application claims priority from Japanese Patent Application JP 2005-065034 filed on Mar. 9, 2005, the content of which hereby incorporated by reference into this application.

TECHNICAL FIELD OF THE INVENTION

The present invention relates to a storage apparatus, and in particular to a technique suitably applied for detecting data abnormality due to data rigging or data falsifying in data to be written in a physical storing device.

BACKGROUND OF THE INVENTION

Conventionally, in a storage apparatus, abnormality in data written in a physical storing device is detected according to a verify check.

There is a technique for detecting falsifying of communication data transmitted through a communication line using compressed data (see Japanese Patent Application Laid-Open 2001-111431, for example).

In abnormality detection according to the conventional verify check, however, such an event occurs that, even if it is determined that data is normal, data which has been written in a physical storing device is abnormal, which results in difficulty in reliable check for data abnormality.

For example, in the verify check, data abnormality is detected by performing a writing processing for writing data according to writing command from a host computer or the like, after the writing processing, reading the written data, and comparing the writing data and the read data with each other. However, such an event occurs that data in a disc cache becomes hit data at a reading time of the data. In such a case, even if the data in a disc cache is normal data and the data becomes abnormal when it is written in a physical storing device, it has been determined as the result of the verify check that the abnormal data is normal.

Factors for occurrence of data abnormality at a writing time of data to a physical storing device include such events as shown below. Therefore, such data abnormalities can not be detected by only the verify check completely.

(1) Writing Idling or Failure to a Medium in a Physical Storing Device

For example, writing can not be performed during data writing due to a failure of a head unit in a physical storing device, which results in idling in data writing.

(2) Address Error at a Writing Time of Data in a Medium

For example, an address error occurs at a writing time of data due to a failure of a selector unit in a physical storing device, which results in writing of writing data in a wrong address.

(3) Writing of Old Data

For example, instead of data to be written at a data writing time, old data stored in a buffer is written without updating thereof to the next new data as it is due to a failure of the buffer in a physical storing device, a failure of a selector, or a failure of a chip enable control signal.

In addition, such a case can be thought that, after data has been written in a physical storing device, falsifying of data is directly performed on the physical storing device during non-accessing from a host computer or the like. Such data rigging after time elapsing can not be checked by the verify check, so that, even if the falsified data is read out after the time elapsing, the data is processed as normal data without verifying the data.

For example, such data rigging includes falsifying of data to a physical storing device, data rewriting or exchange of old data for new data due to a camouflaged communication path, or falsifying of a disc map.

Regarding such data falsifying, data rigging can not be confirmed by the verify check performed at a data writing time and it can not be checked even after the verify check, which results in a problem.

When duplicative writing is performed as master data and backup data, if either one of the master data and the backup data is replaced by wrong data or it becomes abnormal, the master data and the backup data are different from each other, but normal data can not be confirmed from both the master data and the backup data.

In the technique described in Japanese Patent Application Laid-Open No. 2001-111431, falsifying of communication data transmitted via a communication line can be detected, but data abnormality of the data transmitted via the communication line can not be detected at a data writing time to a physical storing device.

SUMMARY OF THE INVENTION

In view of these circumstances, an object of the present invention is to provide a storage apparatus that can detect data abnormality at a writing time of data to a physical storing device or data abnormality due to data falsifying after time elapsing.

A storage apparatus according to the present invention comprises: a plurality of host interface adapter units that control data transfer between the host interface adapter units and an upper apparatus; a disc interface adapter unit that controls data transfer between the disc interface adapter unit and a plurality of physical storing devices; a cache memory unit that stores data temporarily; a switch unit that connects the host interface adapter units, the disc interface adapter unit, and the cache memory unit to one another; a compressed data circuit unit that produces compressed data based upon writing data to each physical storing device; and a compressed data saving unit that saves compressed data produced in the compressed data circuit unit, wherein the compressed data circuit unit, at a reading time of data from the physical storing device, compresses the reading data, compares the compressed data and compressed data corresponding to the reading data that has been saved in the compressed data saving unit with each other, and detects data rigging.

BRIEF DESCRIPTIONS OF THE DRAWINGS

FIG. 10 is a diagram showing one example of a management table for compressed data in the storage apparatus according to the first embodiment of the present invention;

FIG. 11 is a diagram showing one example of a collating and saving data format for saving compressed data in the storage apparatus according to the first embodiment of the present invention;

Figure 23:
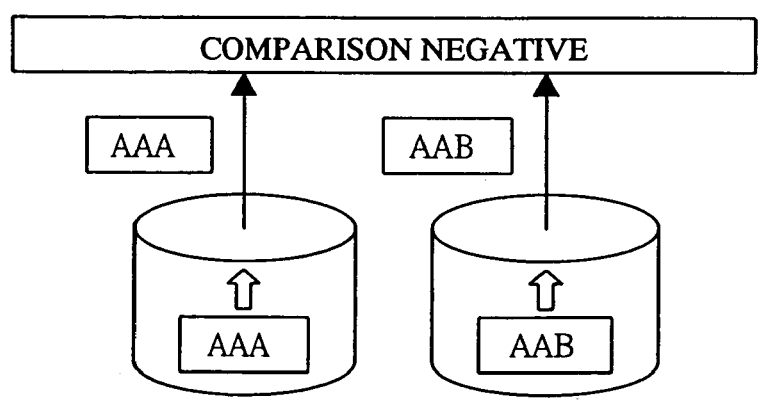
Figure 24:
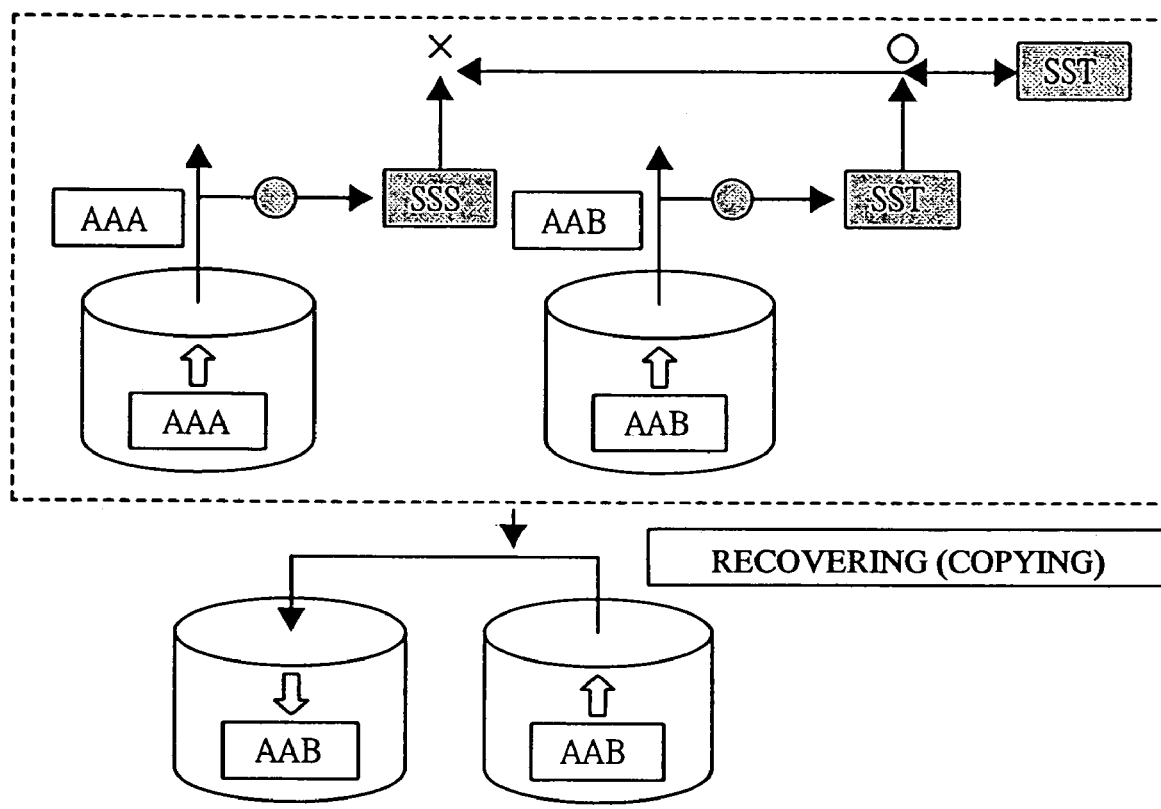

FIG. 23 is a diagram showing a case that double reading is performed after data rigging in the storage apparatus according to the fifth embodiment of the present invention; and FIG. 24 is a diagram showing example where data rigging is corrected by performing double reading to confirm a device that has not been subjected to data rigging in the storage apparatus according to the fifth embodiment of the present invention.

DESCRIPTIONS OF THE PREFERRED EMBODIMENTS

Embodiments of the present invention will be explained below in detail with reference to the drawings. In the whole figures for explaining embodiments, same members or parts are denoted by same reference numerals in principle, and duplicating explanation will be omitted.

First Embodiment

[Constitution of Storage Apparatus]

Figure 1:
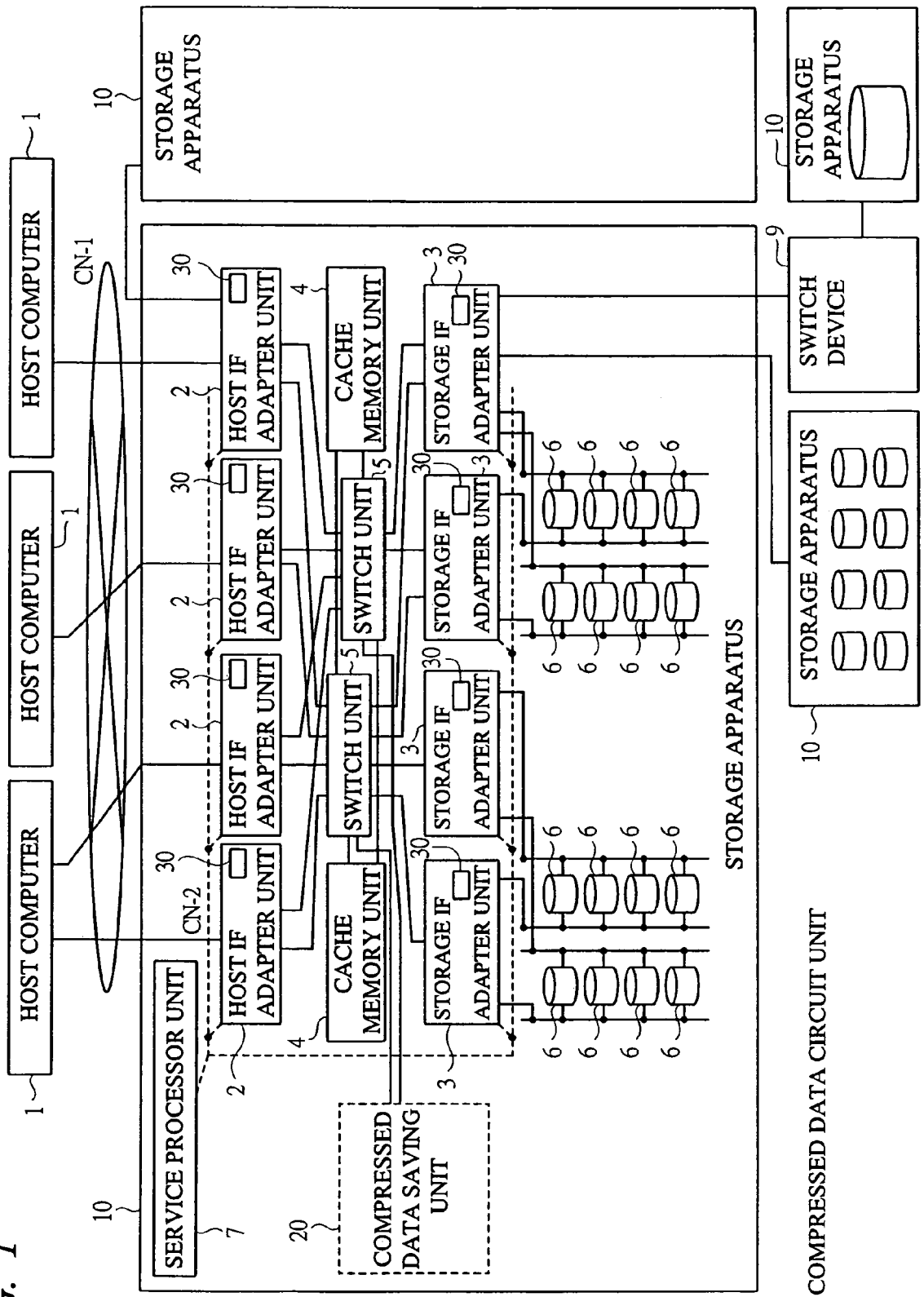
FIG. 1 is a constitution diagram showing a constitution of a storage apparatus according to a first embodiment of the present invention.

A constitution of a storage apparatus according to a first embodiment of the present invention will be explained with reference to FIG. 1. FIG. 1 is a constitution diagram showing a constitution of the storage apparatus according to the first embodiment of the present invention.

In FIG. 1, a storage apparatus 10 is constituted of host interface adapter unit 2, storage interface adapter unit (disc interface adapter units) 3, cache memory units 4, switch units 5, physical storing devices 6, a service processor unit 7, a compressed data saving unit 20, and compressed data circuit units 30 provided in the host interface adapter units 2 and the storage interface adapter units 3.

Each host interface adapter unit 2 receives data from host computer (a host unit) 1 via a network CN-1 and writes it in the cache memory unit 4 via the switch unit 5.

Each storage interface adapter unit 3 determines address in conformity with a specific mapping to the physical storing device 6 of each port connected to transfer data written from the host interface adapter unit 2 to the cache memory unit 4 to the physical storing device 6 and confirm termination of storing thereof to the physical storing device 6. In some cases, the storage interface adapter unit 3 compares the written data and the read data with each other again.

The host interface adapter unit 2 can transfer data from the host computer 1 to two cache memory units 4 by instructing a duplicative writing command to the switch unit 5. Same data pieces in the respective cache memory units 4 can be stored in a logic device constituted of a plurality of more than separated physical storing device 6 from the storage interface adapter unit 3.

The service processor unit 7 is a computer used for maintaining and managing the storage apparatus 10.

The compressed data saving unit 20 is connected to the switch unit 5 to recover saved compressed data from the storage interface adapter unit 3 connected to the physical storing device 6 or the host interface adapter unit 2 connected at a remote copy or the like. Incidentally, the compressed data saving unit 20 may be directly connected to the storage interface adapter unit 3 and the host interface adapter unit 2 to recover compressed data instead of its connection to the switch unit 5.

The compressed data saving unit 20 is for saving produced compressed data from the compressed data circuit unit 30, and it may be constituted of a non-volatile memory or such a physical storing disc as HDD with high performance and high reliability. The compressed data to be saved is managed so as not to cause data abnormality, data falsifying, or the like.

When the compressed data saving unit 20 is constituted of a non-volatile memory, such merit can be obtained that reliability of data can be increased and failure occurrence can be reduced due to that the non-volatile memory does not include any movable parts. When the compressed data saving unit 20 is constituted of a disc such as HDD, such merit can be obtained that it can save compressed data more than that saved in the non-volatile memory and data writing speed is fast, so that a processing speed of data can be made fast.

Since the compressed data saving unit 20 writes compressed data of writing data into the physical storing device 6 instead of the writing data itself into the physical storing data 6 regardless of constitution thereof, it may have a small storage capacity. In both the non-volatile memory and such a physical storing disc as a HDD, it is possible to employ a constitution where a storage capacity is small but excellent performance is provided, a constitution where complete error correction is performed, or the like and it is possible to improve reliability of data saved in the compressed data saving unit 20.

The storage apparatus 10 can be connected to not only the physical storing device 6 internally connected but also another externally connected storage apparatus 10 serving as an externally connected device via the host interface adapter unit 2 or the storage interface adapter unit 3.

The storage apparatus 10 can be connected to another storage apparatus externally connected and serving as an externally connected device via the switch device 9 connected to the storage interface adapter unit 3.

[Constitution of Compressed Data Circuit Unit]

Figure 2:
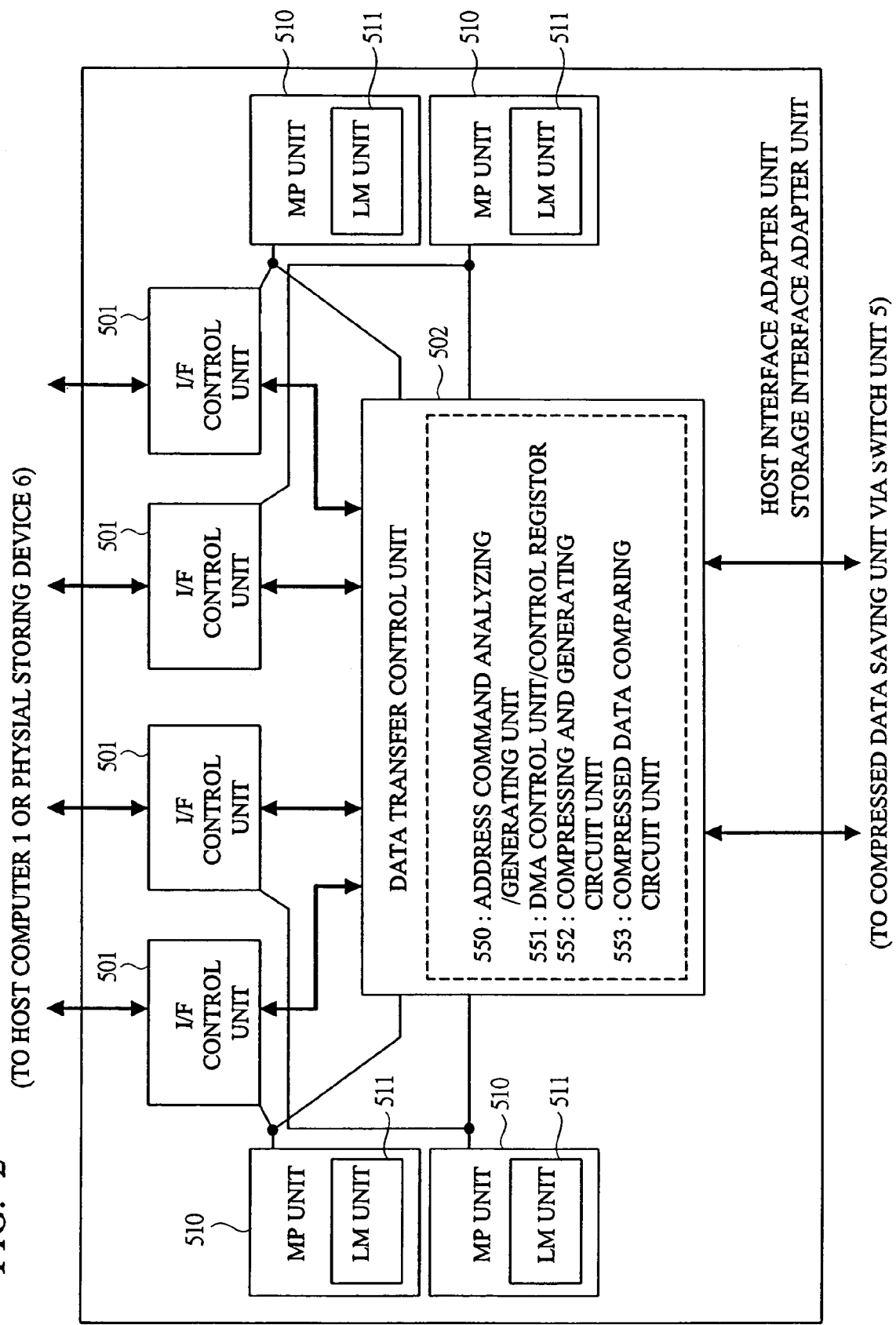
FIG. 2 is a constitution diagram showing constitutions of a host interface adapter unit and a storage interface adapter unit in the storage apparatus according to the first embodiment of the present invention.
Figure 3:
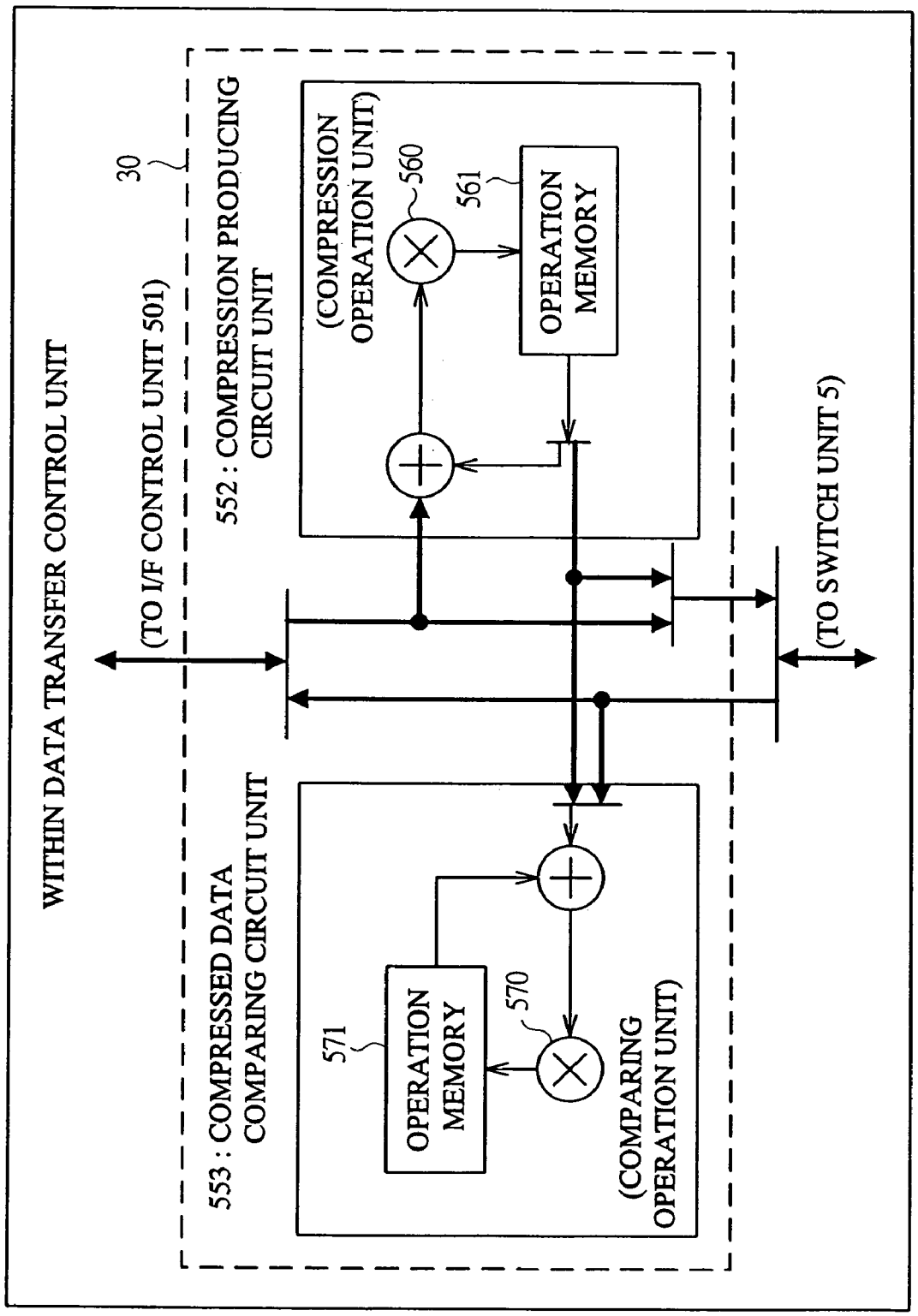
FIG. 3 is a constitution diagram showing a constitution of a compressed data circuit unit in the host interface adapter unit and the storage interface adapter unit in the storage apparatus according to the first embodiment of the present invention.

Next, a constitution of the compressed data circuit unit in the storage apparatus according to the first embodiment of the present invention will be explained with reference to FIGS. 2 and 3. FIG. 2 is a constitution diagram showing constitutions of the host interface adapter unit and the storage interface adapter unit in the storage apparatus according to the first embodiment of the present invention, and FIG. 3 is a constitution diagram showing a constitution of the compressed data circuit unit in each of the host interface adapter unit and the storage interface adapter unit in the storage apparatus according to the first embodiment of the present invention.

In FIG. 2, the host interface adapter unit 2 and the storage interface adapter unit 3 are constituted of an interface control unit 501, a data transfer control unit 502, a microprocessor unit 510, and a local memory unit 511 positioned in the microprocessor unit 510, and the data transfer control unit 502 are constituted of an address command analyzing/generating unit 550, a DMA control unit/control register 551, a compression producing circuit unit 552, and a compressed data comparing circuit unit 553.

The compressed data circuit unit 30 is constituted of the compression producing circuit unit 552 and the compressed data comparing circuit unit 553 disposed in the data transfer control unit 502.

In the host interface adapter unit 2 and the storage interface adapter unit 3, the interface control unit 501 and the data transfer control unit 502 are controlled according to processing performed by the microprocessor unit 510 and such a processing as data transfer between the host computer 1 and the physical storing device 6, or data transfer to the compressed data saving unit 20 via the switch unit 5 is performed.

In FIG. 3, the compression producing circuit unit 552 of the compressed data circuit unit 30 is constituted of a compression operation unit 560 and an operation memory 561, and the compression data comparing circuit unit 553 is constituted of a comparison operation unit 570 and an operation memory 571.

The compression producing circuit unit 552 compresses writing data from the interface control unit 501 in the compression operation unit 560 and the operation memory 561 to transmit the resultant compressed data to the compressed data saving unit 20 via the switch unit 5, and saves the compressed data obtained by compression operation in the compressed data saving unit 20.

The compressed data comparing circuit unit 553 compares the compressed data of the reading data read from the interface control unit 501 and the compressed data saved in the compressed data saving unit 20 with each other to determine whether or not the read compressed data and the saved compressed data coincide with each other in the comparison operation unit 570 and the operation memory 571.

[Outline of Operation of Storage Apparatus]

Figure 4:
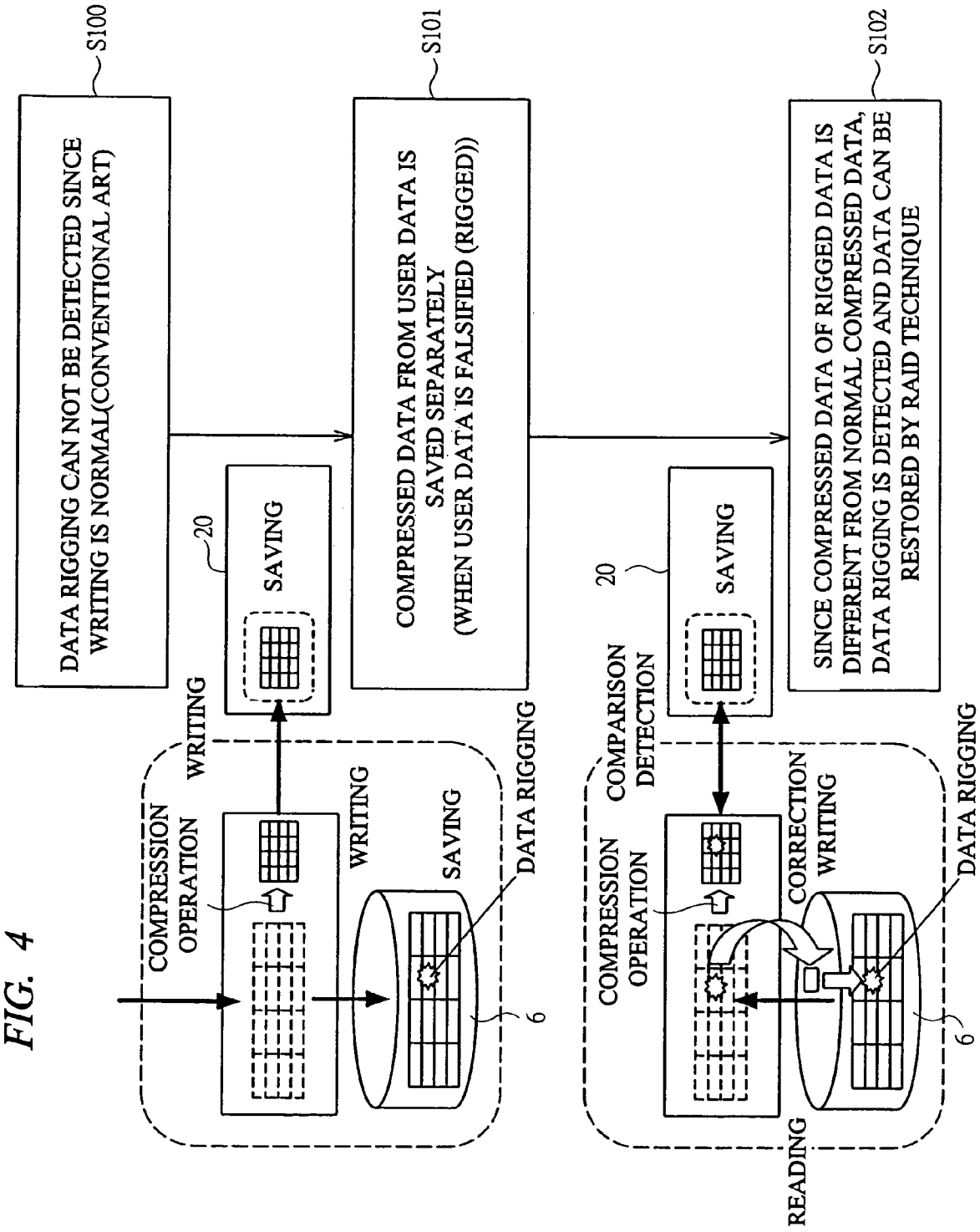
FIG. 4 is an explanatory diagram for explaining outline of an operation in the storage apparatus according to the first embodiment of the present invention.

Next, outline of an operation in the storage apparatus according to the first embodiment of the present invention will be explained with reference to FIG. 4. FIG. 4 is an explanatory diagram for explaining outline of an operation in the storage apparatus according to the first embodiment of the present invention.

As shown in FIG. 4, such a case occurs conventionally as described above that, even if verify check is performed on writing data, data written in a physical storing device becomes abnormal, although the result obtained by the verify check is normal (Step 100). In the embodiment, compression operation is performed on writing data by the compression producing circuit unit 552 at a writing time of the data, and the compressed data obtained by the compression operation is saved in the compression data saving unit 20 different from the physical storing device 6 (S101).

When user data is falsified (rigged), comparison with compressed data of the falsified (rigged) data is performed in the compressed data comparing circuit unit 553 at a reading time of the data, and data rigging is detected based upon a difference in compressed data, so that the rigged data can be recovered using, for example, a RAID technique (S102).

Detection of falsifying (rigging) of data using compressed data can be performed not only at the reading time of data but also at a time of periodic diagnosis, and it may be performed on all data stored in the physical storing device 6.

[Algorithm of Compression]

Figure 5:
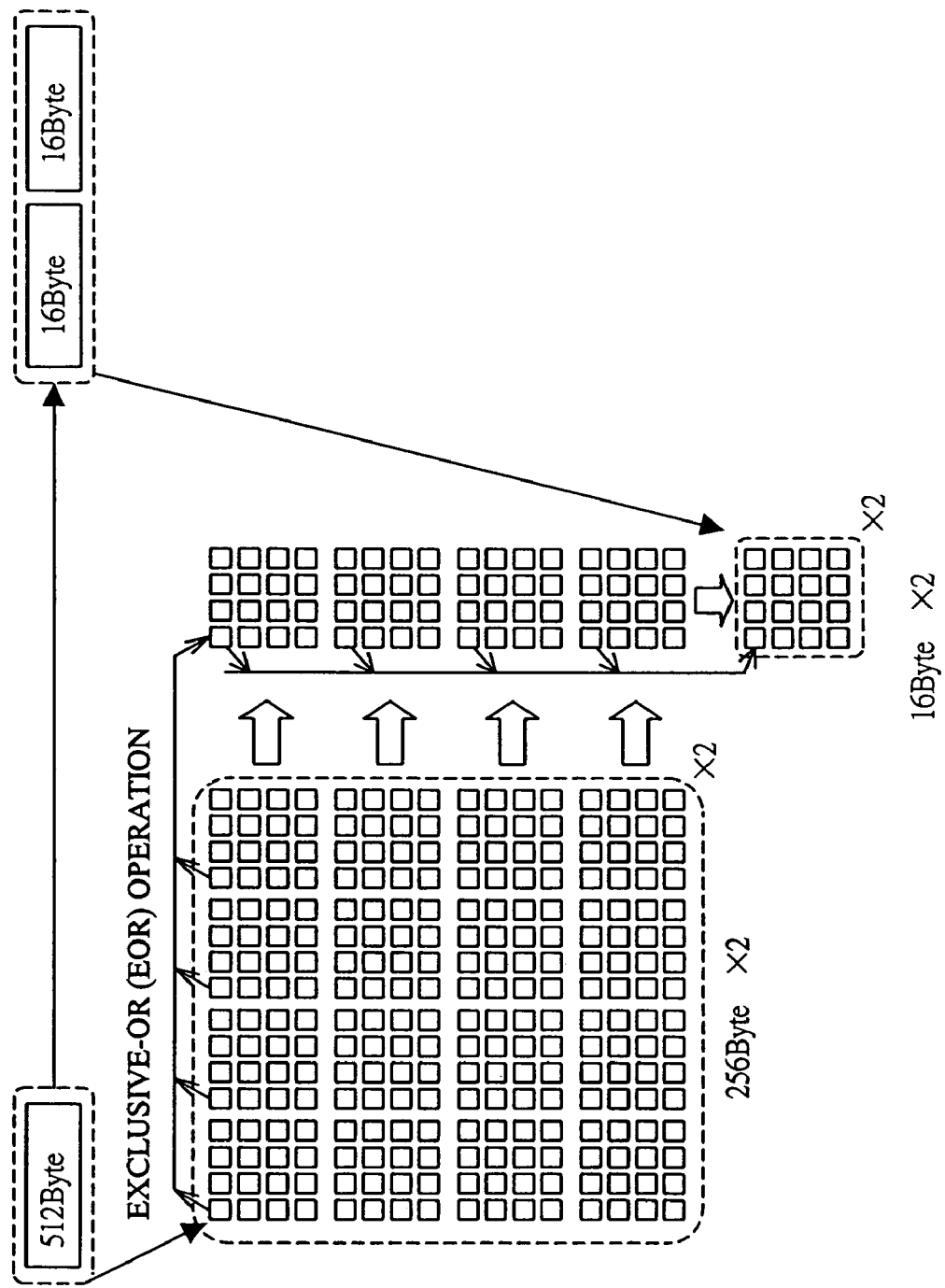
FIG. 5 is an explanatory diagram for explaining one example of a compression algorithm in the storage apparatus according to the first embodiment of the present invention.

Next, one example of a compression algorithm of the storage apparatus according to the first embodiment of the present invention will be explained with reference to FIG. 5. FIG. 5 is an explanatory diagram for explaining one example of a compression algorithm of the storage apparatus according to the first embodiment of the present invention.

In the embodiment, as shown in FIG. 5, for example, compression data is produced as data of 16 bytes×2 by constituting data of each 512 bytes as data of 256 bytes×2 to repeat EOR operation for each 4 bytes.

Accordingly, it is possible to detect data rigging for each 512 bytes according to the produced compressed data.

The compressed data is data for determining whether or not data of 512 bytes is rigged data, and since irreversible compression is performed according to the EOR operation, rigging detection for data of 512 bytes can be performed using data of only 32 bytes.

Therefore, a data volume of compressed data can be reduced, and a storage capacity of the compressed data saving unit 20 that saves compressed data can be reduced, so that it is made possible to use a disc or a memory with further high performance and high reliability.

[Operation for Saving and Collating Compressed Data]

Figure 6:
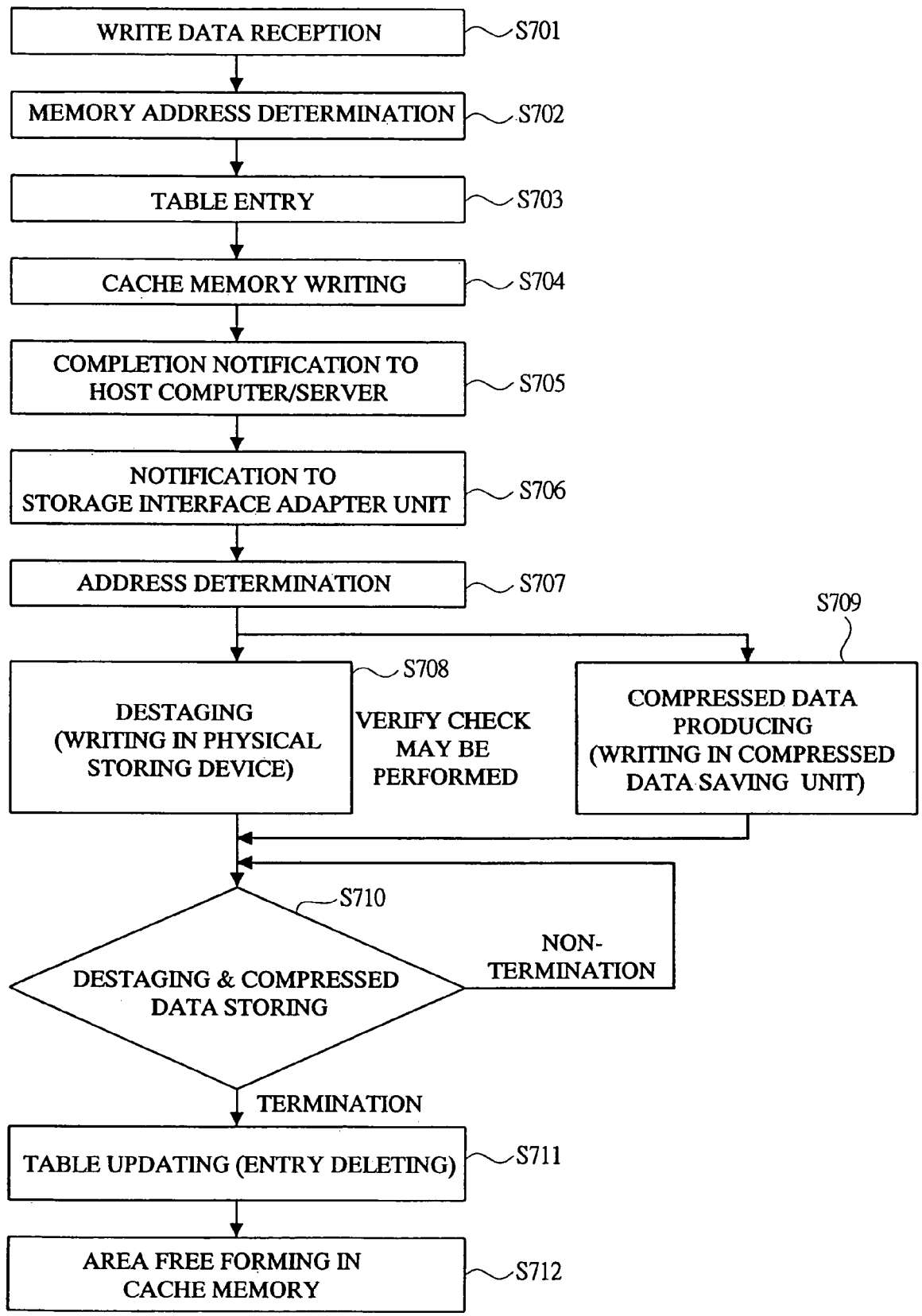
FIG. 6 is a flowchart showing a saving operation for compressed data in the storage apparatus according to the first embodiment of the present invention.
Figure 7:
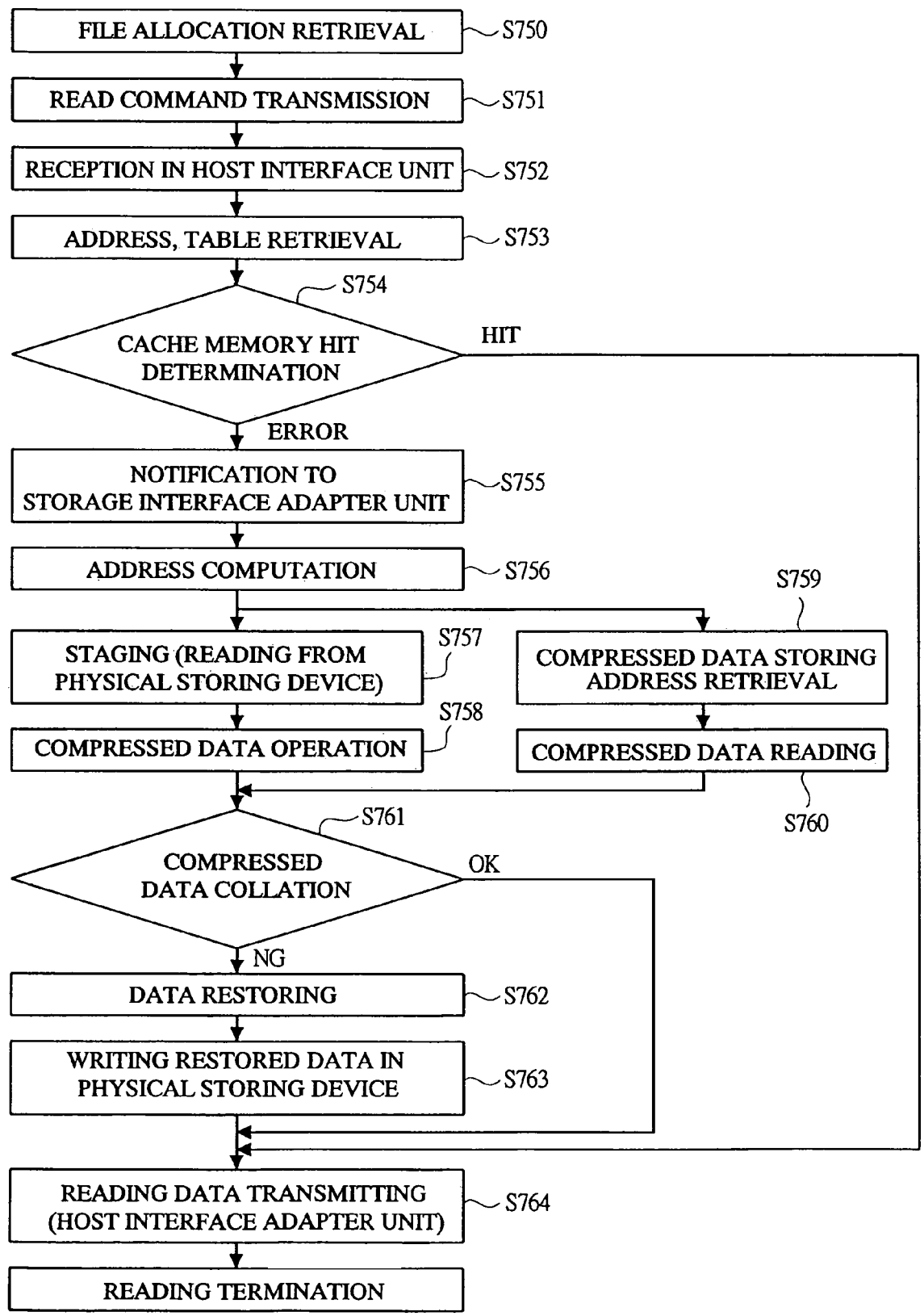
FIG. 7 is a flowchart showing a collating operation for the compressed data in the storage apparatus according to the first embodiment of the present invention.

Next, operations for saving and collating compressed data in the storage apparatus according to the first embodiment of the present invention will be explained with reference to FIG. 6 and FIG. 7. FIG. 6 is a flowchart showing an operation for saving compressed data in the storage apparatus according to the first embodiment of the present invention and FIG. 7 is a flowchart showing an operation for collation of compressed data in the storage apparatus according to the first embodiment of the present invention.

As shown in FIG. 6, in the host interface adapter unit 2, write data is first received from the host computer 1, a server, or the like (S701), a memory address is determined (S702), a table entry processing is performed (S703), and a cache memory write processing is performed (S704) as an operation for saving compressed data in the storage apparatus.

A completion notification is notified to the host computer 1, the server or the like (S705) and notification to the storage interface adapter unit 3 is conducted (S706).

In the storage interface adapter unit 3, an address to the physical storing device 6 is determined (S707), a destaging processing is performed and writing into the physical storing device 6 is conducted (S708).

Compressed data is produced in concurrently with the destaging processing in Step S708, and it is saved in the compressed data saving unit 20 (S709).

Determination is made about whether or not the destaging processing at Step S708 and storage of the compressed data at Step S709 have been terminated (S710). When non-termination is determined at Step S710, the control returns back to Step S710. On the other hand, when termination is determined at Step S710, table updating for deleting entry of write data is performed (S711), an area free processing of the cache memory to write data is performed (S712) to terminate the processing.

As shown in FIG. 7, first, a file allocation retrieval is performed (S750) and a read command is transmitted (S751) on the host computer 1 side as an operation for collation of compressed data in the storage apparatus 10.

The read command is received by the host interface adapter unit 2 (S752) and target address and the table which include the corresponding address are retrieved thereby (S753).

Determination is made about whether or not there is a cache memory hit to the read command (S754), and when a cache error is determined at Step S754, such a fact is notified to the storage interface adapter unit 3 (S755), an address is computed (S756), a staging processing is performed to perform reading from the physical storing device 6 (S757), and computation for compressed data is performed (S758).

A compressed data storing address is retrieved (S759) in concurrently with the staging processing at Step S757, and the compressed data is read out (S760).

The compressed data computed at Step S758 and the compressed data read at Step S760 are collated with each other (S761). When the collation is affirmative at Step S761, the read data is transmitted (S764), and the control is terminated.

When the collation is negative at Step S761, data restoring is performed using a RAID technique or the like (S762), the restored data is written in the physical storing device 6 (S763), and the read data is transmitted (S764), and the control is terminated.

When a cache hit is determined at Step S754, the read data is transmitted (S764) and the control is terminated.

[Management of Compressed Data and Data Restoring]

Figure 8:
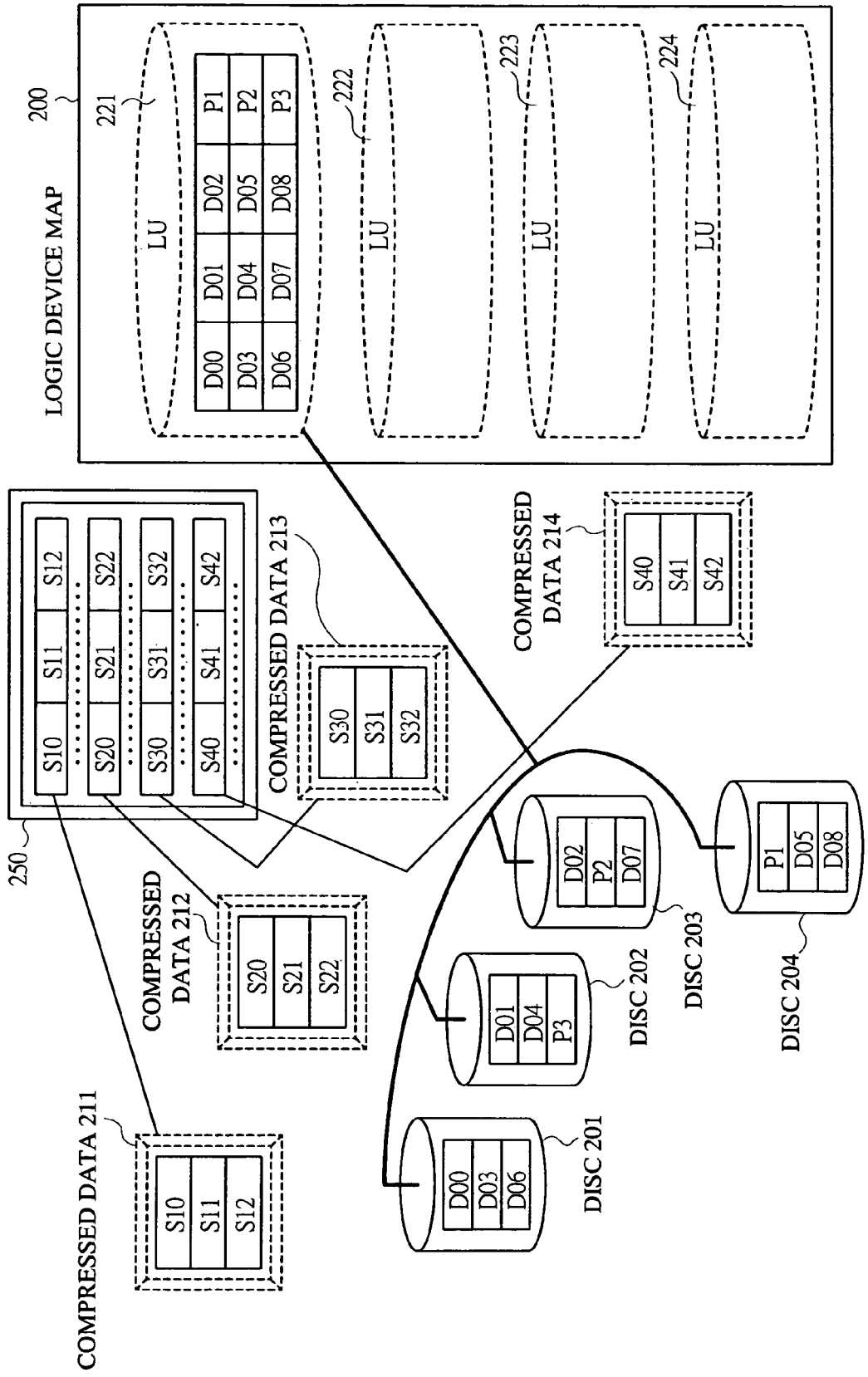
FIG. 8 is a diagram showing data example where compressed data is saved of each disc in a physical storing device in the storage apparatus according to the first embodiment of the present invention.
Figure 9:
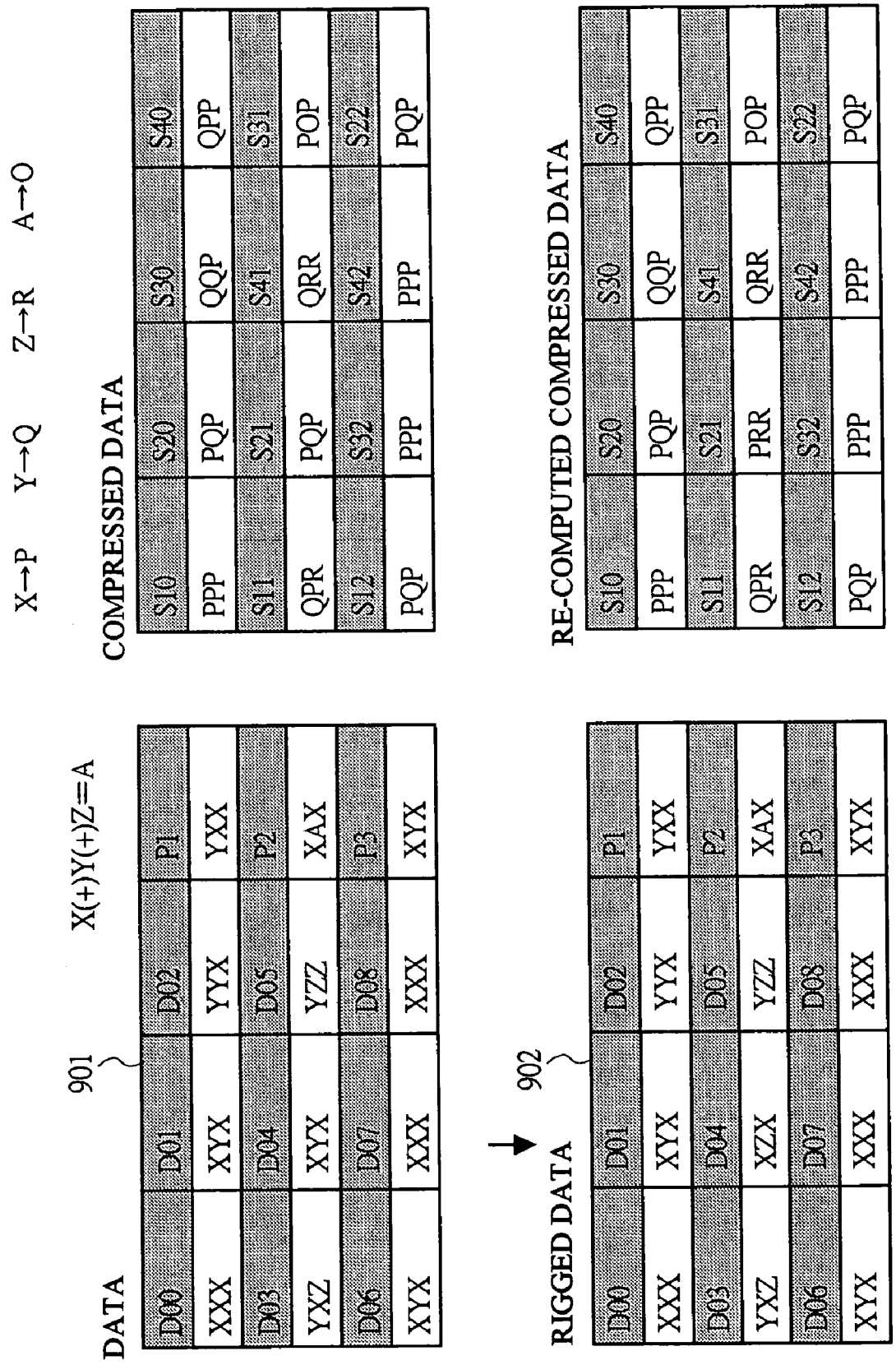
FIG. 9 is an explanatory diagram for explaining a relationship between rigged data and compressed data in the storage apparatus according to the first embodiment of the present invention.

Next, management of compressed data and data restoring in the storage apparatus according to the first embodiment of the present invention will be explained with reference to FIGS. 8 to 11. FIGS. 8 to 11 are explanatory diagrams for explaining management of compressed data and data restoring in the storage apparatus according to the first embodiment of the present invention. FIG. 8 is a diagram showing a data example where compressed data is saved in each disc in a physical storing device, FIG. 9 is an explanatory diagram for explaining a relationship between rigged data and compressed data, FIG. 10 is a diagram showing one example of a management table for compressed data, and FIG. 11 is a diagram showing one example of a collating and saving data format for saving compressed data.

In the embodiment, as shown in FIG. 8, compressed data 211 to 214 are produced for each disc 201 to 204 in the physical storing device 6, and a physical device map 250 for compressed data is produced to a physical device map of internal disc data.

A logic device map 200 is produced to a plurality of discs 201 to 204, and a logic device 221 is recognized as a logic device with a RAID constitution of 3D+P constituted of the discs 201 to 204, where, even if data in either disc of the discs 201 to 204 is rigged, the rigged data can be recovered from data in the remaining discs.

For example, the compressed data is saved in a form of a collating and saving data format such as shown in FIG. 11, and management of the compressed data can be performed according to the management table such as shown in FIG. 10.

As shown in FIG. 9, when partial data (data D04) of writing data 901 constituted as a logic device 221 is rigged to form rigged data 902, since the compressed data (data S21 stored with compressed data of data D04) produced at a writing time is different from the compressed data re-calculated at a reading time, it is detected that the data D04 is a rigged data.

For example, FIG. 9 is a diagram showing an example that compressed data of data "X" is "P", compressed data of data "Y" is "Q", compressed data of data "Z" is "R", and compressed data of data "A" is "O". FIG. 9 is also a diagram showing an example that parity generation "X(+) Y(+) Z=A ((+)=EOR operation) is performed.

In FIG. 9, the data D04 at a writing time is "XYX", and the data D04 at a reading time that is rigged data is "XZX", compressed data S21 corresponding to the former is "PQP", and compressed data S21 corresponding to the latter is "PRP". Since it is detected from comparison of both the compressed data that they are not coincident with each other, it is detected that the data D04 is rigged one.

The data ("XZX" of D04) detected as the rigged data can be computed from other data (data elements D03, D05, P2), data "Z" in the data D04 is restored as data "Y", so that the rigged data "XZX" can be restored as normal data "XYX".

Since the data "XYX" is compressed as the "PQP", when the data D4 is read next, rigging can not be detected from comparison of compressed data, and the data D04 is normal one.

After restoration is conducted in this manner, the number of restorations in a management table such as shown in FIG. 10 is updated, so that, when data at the same position is restored plural times, such a determination may be made that a possibility of a failure is high.

As described above, according to the present invention, since compressed data to data at a data writing time is produced by the compressed data circuit unit 30, it is saved in the compressed data saving unit 20 different from the physical storing device 6, the compressed data of reading data and the compressed data corresponding to reading data saved in the compressed data saving unit 20 are compared at a data reading time, and rigging to the reading data is detected based upon the comparison, data used for detecting data rigging can be reduced, and a backup capacity can also be reduced. By utilizing a RAID constitution producing a redundant parity code, data rigging detected can be corrected, and rigged data can be restored to normal original data.

Even data read after a long time elapses from its storage can be confirmed about its data reliability, and even current data saved for a long time elapses without being accessed can be confirmed periodically about rigging to the data.

It is possible to provide a function for monitoring data rigging to another device externally connected. Further, it is made possible to restore data by employing a redundant constitution in another device externally connected.

Second Embodiment

A second embodiment employs a constitution that compressed data is produced for each port of the host interface adapter unit 2 and the storage interface adapter unit 3 instead of production of compressed data at each physical storing device 6 in the first embodiment.

A constitution of the storage apparatus in the second embodiment is similar to that in the first embodiment, and an operation of the former is similar to that of the latter except that production of compressed data is performed for each port of the host interface adapter unit 2 and the storage interface adapter unit 3 instead of production for each of the physical storing devices 6.

[Management of Compressed Data and Data Restoring]

Figure 12:
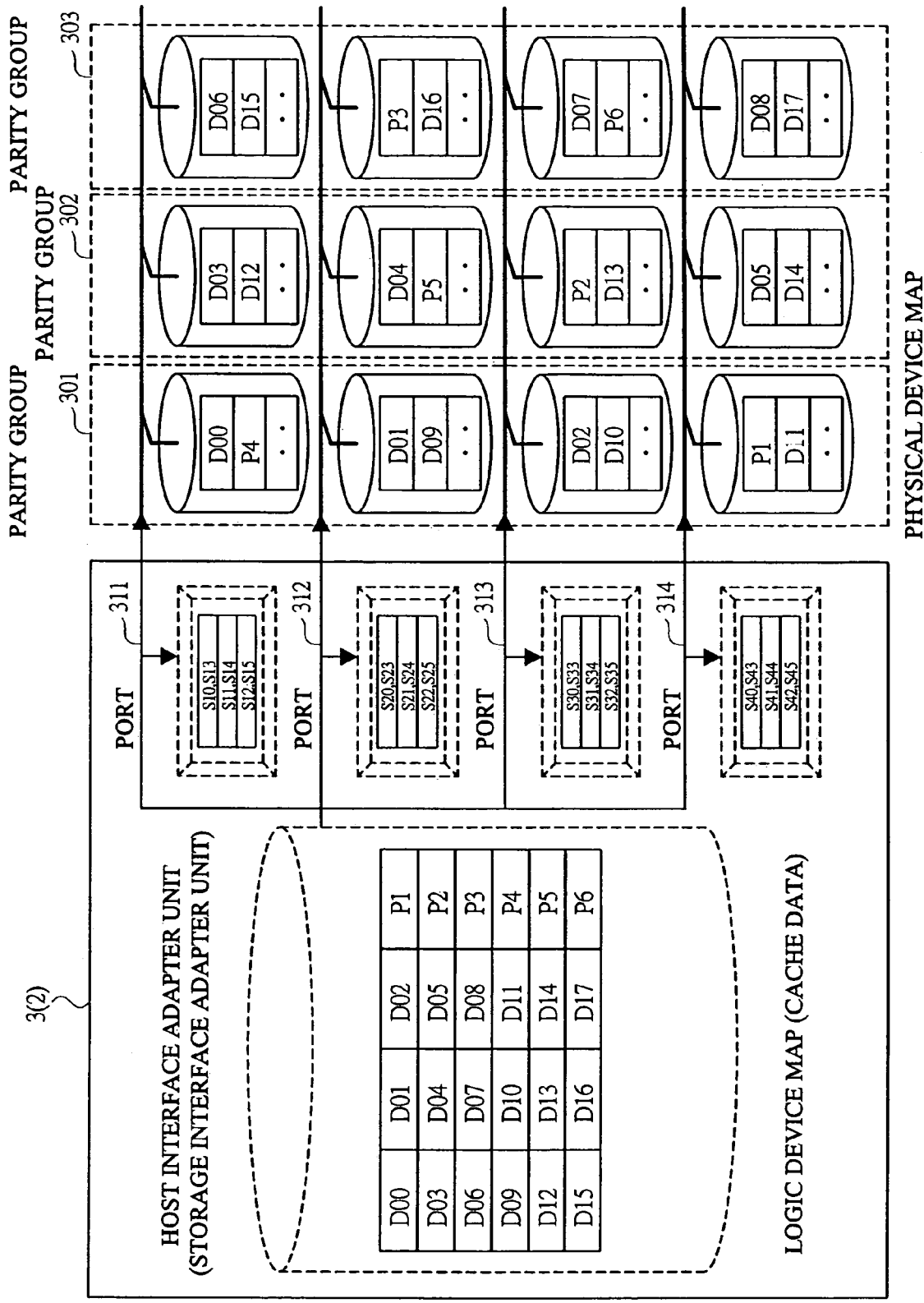
FIG. 12 is an explanatory diagram for explaining connection of an internal disc to a connection port in a storage apparatus according to a second embodiment of the present invention.
Figure 13:
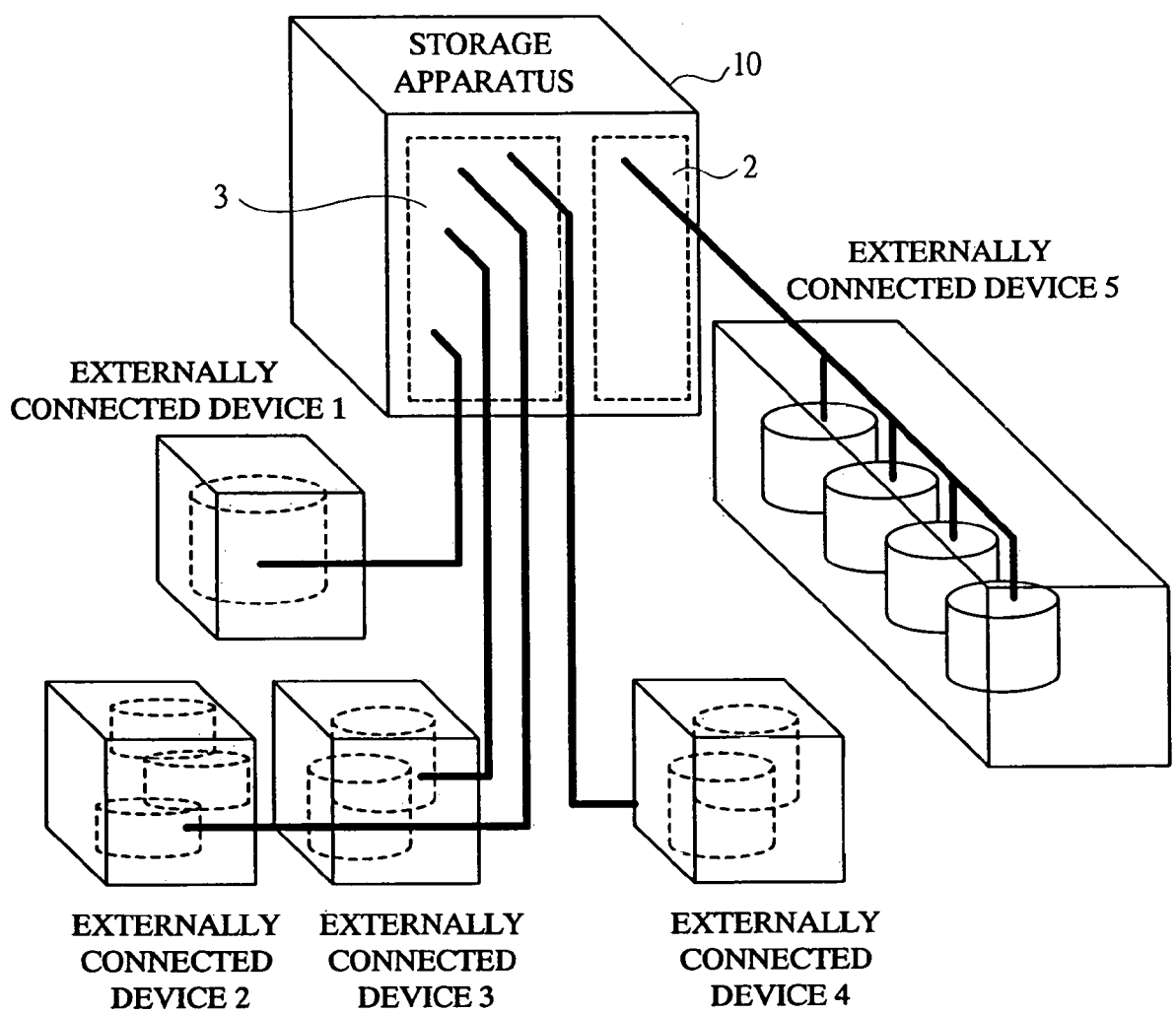
FIG. 13 is an explanatory diagram for explaining connection of an external disc to a connection port in the storage apparatus according to the second embodiment of the present invention.
Figure 14:
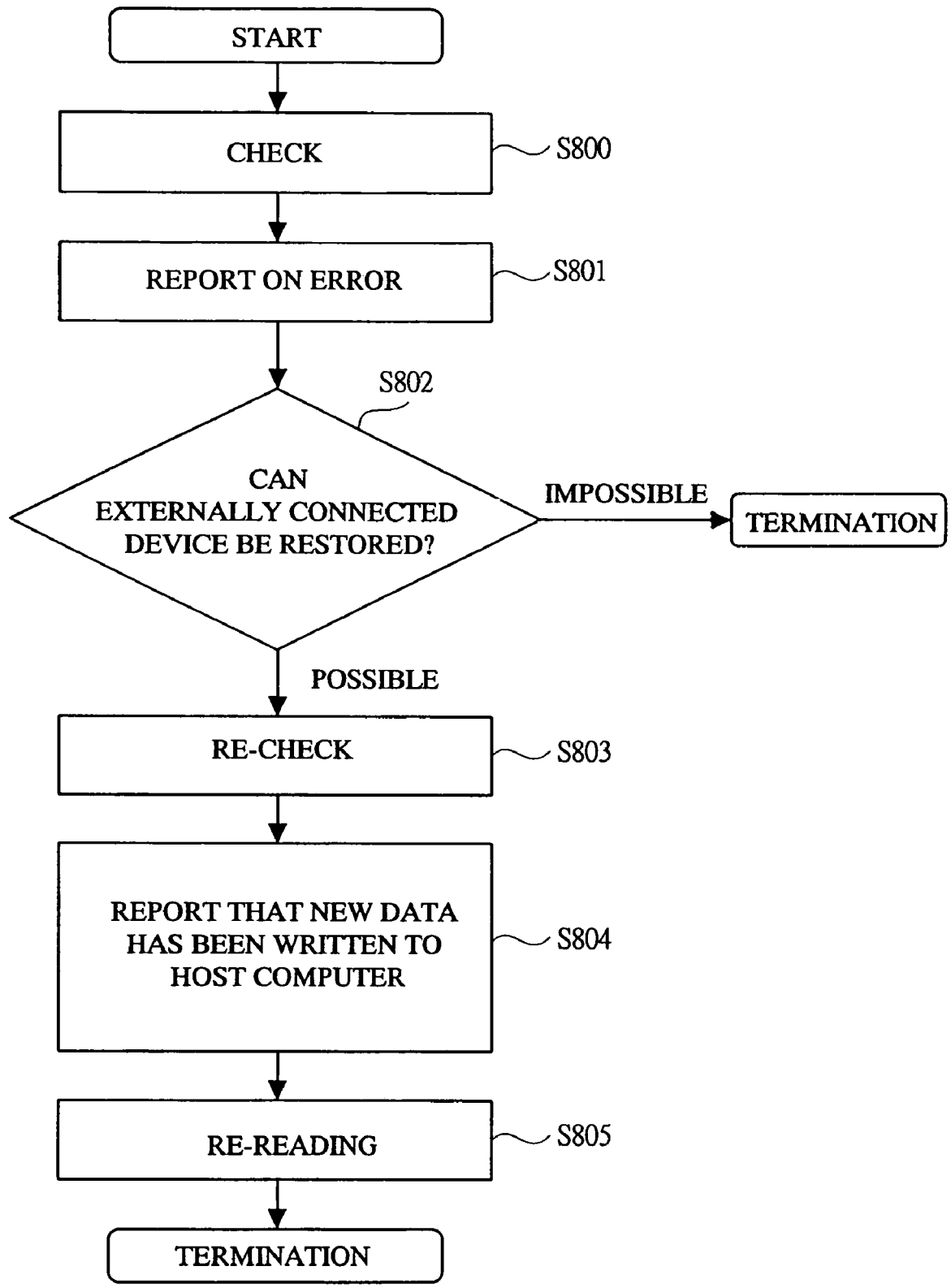
FIG. 14 is a flowchart showing an error processing when an external connection device is connected to a connection port in the storage apparatus according to the second embodiment of the present invention.

Next, management of compressed data and data restoration in the storage apparatus according to the second embodiment of the present invention will be explained with reference to FIGS. 12 to 14. FIGS. 12 to 14 are explanatory diagrams for explaining management of compressed data and data restoration in the storage apparatus according to the second embodiment of the present invention. FIG. 12 is an explanatory diagram showing connection of an internal disc to a connection port, FIG. 13 is an explanatory diagram showing connection of an external disc to a connection port, FIG. 14 is a flowchart showing an error processing when an externally connected device is connected to a connection port.

When an internal disc is connected to a connection port of the storage interface adapter unit 3, for example, as shown in FIG. 12, compressed data to an internal device constituted of a physical storing device 6 connected to each of ports 311 to 314 is produced for each port and it is saved in the compressed data saving unit 20.

The internal device constituted of physical storing devices 6 connected to respective ports 311 to 314 is managed as a logic device map 320 and managed as data with a redundant constitution.

In an example shown in FIG. 12, the redundant constitution employs a constitution that parity groups 301 to 303 are produced at respective different ports. The parity group can be produced in the same or one port.

As shown in FIG. 12, it is assumed that even compressed data is produced for each port, where the internal device is connected to each port, when data rigging is detected in comparison of compressed data at a data reading time, the rigged data can be restored and rewritten to normal data by utilizing the other data in a parity group to which the data from which the rigging has been detected belongs.

When an external discs are connected to connection ports of the host interface adapter unit 2 or the storage interface adapter unit 3, such a constitution is employed that externally connected devices 1 to 4 are connected to connection ports of the storage interface adapter units 3 and an externally connected device 5 is connected to the host interface adapter unit 2, for example, as shown in FIG. 13.

In the example shown in FIG. 13, four devices of the externally connected devices 1 to 4 is managed as one storing device with a RAID constitution, and one device of the externally connected device 5 is managed as one storing device.

An internal constitution in each of the externally connected devices 1 to 5 can not grasped from the storage apparatus 10, so that management of each data is performed by virtually using a logic device map within the storage apparatus 10, as shown in FIG. 12.

In the externally connected devices 1 to 4, data with a redundant constitution is produced according to the logic device map like the internal device, and data writing is performed as a device with a RAID constitution constituted of the externally connected devices 1 to 4.

At that time, compressed data to data at each port is produced as data for a virtual logic device map, and is saved in the compressed data saving unit 20.

Even in an externally connected device as shown in FIG. 13, when writing data is normally written in a cache memory of an externally connected device but a failure occurs in writing to a physical storing device of an externally connected device thereafter, such a fact that data has been normally written in the cache memory is reported to the storage apparatus 10 side, and data rigging to the physical storing device in the externally connected device can not be detected on the storage apparatus 10 side at a data writing time.

Therefore, in a case of the externally connected devices 1 to 4, when data rigging is detected in comparison of compressed data at a data reading time, since the constitution in the externally connected devices 1 to 4 is unknown, an externally connected device in which data from which the data rigging has been detected is stored is closed so that the normal data can be restored from the remaining three externally connected devices.

Data restoration can be performed by writing the date restored by the remaining three externally connected devices in the externally connected device from which the data rigging has been detected, when the externally connected device itself does not include a failure or writing the date restored by the remaining three externally connected devices in an externally connected device replaced for the externally connected device from which the data rigging has been detected, when the externally connected device includes any failure.

For example, when four externally connected devices have the same constitution and the constitution of each externally connected device can be managed on the storage apparatus 10 side like the internal device, a logic device map can be managed like the internal device, data management can be performed like the internal device with a RAID constitution, and restoring of data can be performed like the internal device.

In the externally connected device 5, when data rigging is detected in comparison of compressed data at a data reading time, since the constitution in the externally connected device 5 is unknown, the data rigging is reported to the externally connected device 5 and it is handled in the externally connected device 5 side.

When the externally connected device 5 takes an external RAID constitution such as 3D+P therein, data rigging portion can be grasped from a report about the data rigging from the storage apparatus 10, and if the data rigging can be corrected by the RAID, restoration of the data can be performed according to an internal processing in the externally connected device 5.

When the externally connected device 5 does not take such a constitution as a RAID constitution, the data cannot be restored. However, data rigging can be confirmed and any countermeasures can be taken to data rigging.

In such a case that backup data or the like is saved on the host computer 1 side, it is possible to restore the data that has been rigged in the externally connected device 5 from the backup data saved. At that time, collation is performed by comparing compressed data saved in the compressed data saving unit 20 and compressed data of the backup data with each other, and after it is confirmed that the backup data is normal, the data is restored.

In such a processing that an external disc is connected to a connection port of the host interface adapter unit 2 or the storage interface adapter unit 3, as shown in FIG. 14, when a reading command of data from the host computer 1 is generated, data rigging is checked by comparing compressed data saved in the compressed data saving unit 20 and compressed data of data read according to the reading command with each other (S800).

When data rigging is detected at Step S800, report on an error or the data rigging is transmitted to the host computer 1 and the externally connected device (S801). When any data rigging is not detected at Step S800, normal data reading processing is performed and the read data is transmitted to the host computer 1.

After the report on an error at Step S801, determination is made about whether or not data in the externally connected device can be restored (S802). When it is determined at Step S802 that the restoration is impossible, the processing is terminated, and if the data can be restored from backup data in the host computer 1 or the like, the data is restored based upon the backup data.

When it is determined at Step S802 that the data can be restored, for example, data rigged is restored to its original data according to the RAID constitution of 3D+P, and the restored data is re-checked (S803).

Such a fact that new data has been written is reported to the host computer 1 (S804), re-reading is performed from the host computer 1 (S805), and the reading processing is terminated.

As described above, in the embodiment, since compressed data to data at a data writing time is produced for each connection port by the compressed data circuit unit 30, the compressed data is saved in the compressed data saving unit 20 different from the physical storing device 6, compressed data of reading data and the compressed data corresponding to reading data saved in the compressed data saving unit 20 are compared with each other at a data reading time, and detection is made about whether or not the reading data has been rigged, data rigging can be detected to not only the internal connection device but also the externally connected device, and rigged data can be restored to original data when a plurality of external connection device is constituted in a redundant manner or a redundant constitution is employed in an external connection device.

Third Embodiment

A third embodiment is constituted by connecting a plurality of storage apparatuses according to the first embodiment for detecting data rigging when data is transferred from one storage apparatus to another storage apparatus according to remote copy.

In the third embodiment, each storage apparatus 10 has a constitution similar to that in the first embodiment, and such a constitution is employed that one storage apparatus 10 is connected to another storage apparatus 10 via, for example, the host interface adapter unit 2, and data transfer is performed between the storage apparatuses 10 according to remote copy.

In the storage apparatus 10 according to the third embodiment, compressed data is produced at a data writing time and it is saved in the compressed data saving unit 20 like the first embodiment, and an operation at a data writing time and an operation at a data reading time are also performed like the first embodiment.

[Operation at Remote Copying Time]

Figure 15:
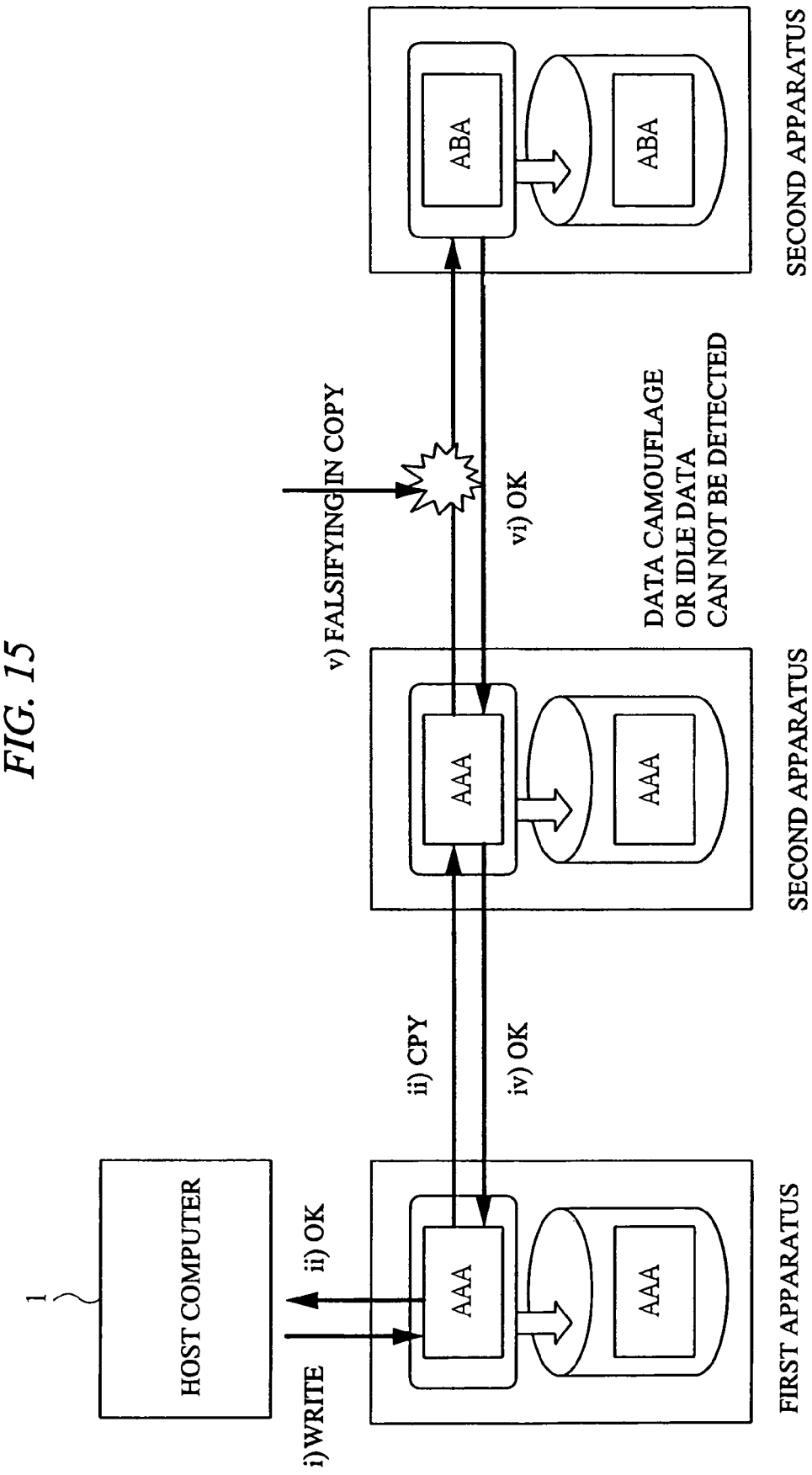
FIG. 15 is a diagram showing data flow of a remote copy using three storage apparatuses according to a third embodiment of the present invention.
Figure 16:
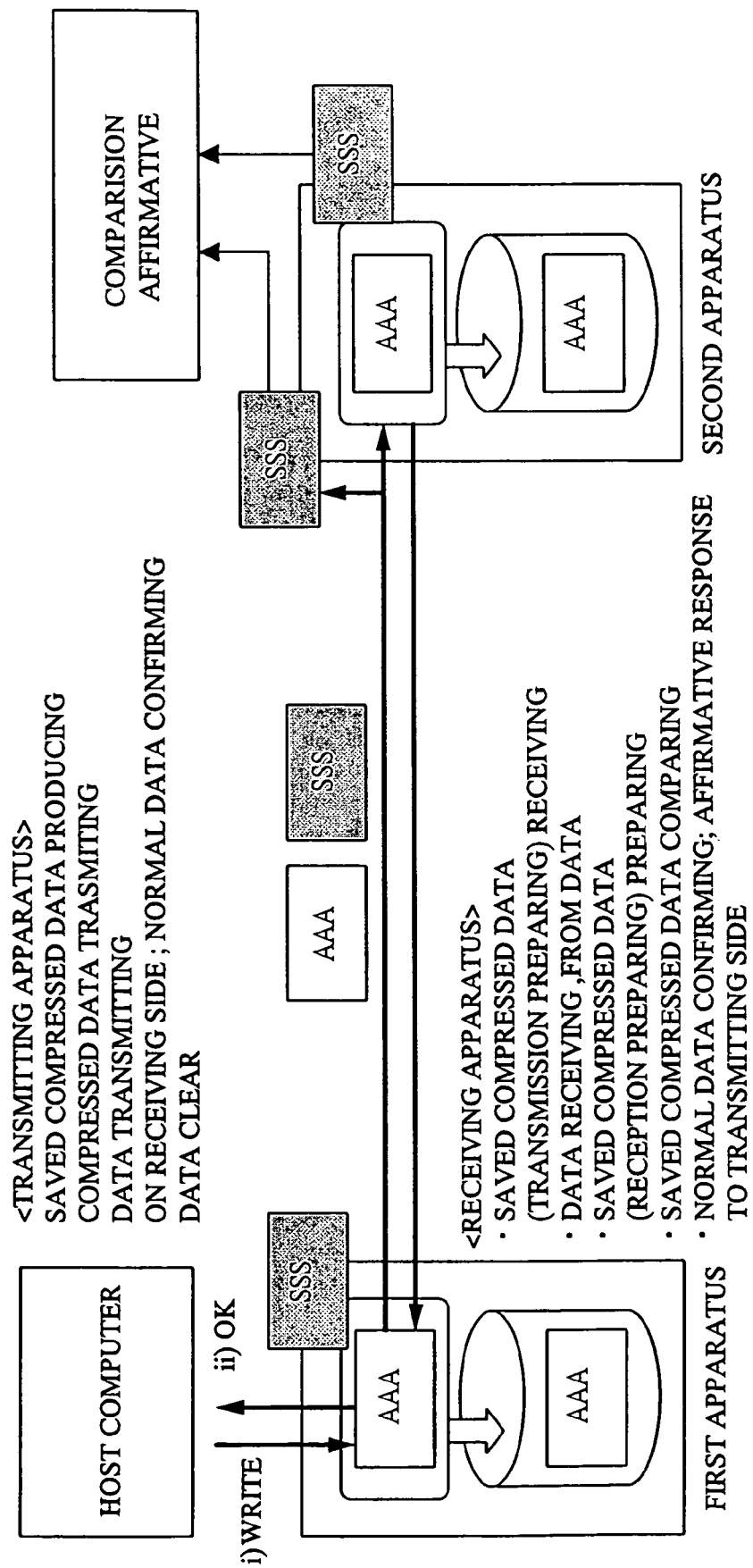
FIG. 16 is a diagram showing an operation when data falsifying or the like has not occurred at a time of remote copying in the storage apparatus according to the third embodiment of the present invention.
Figure 17:
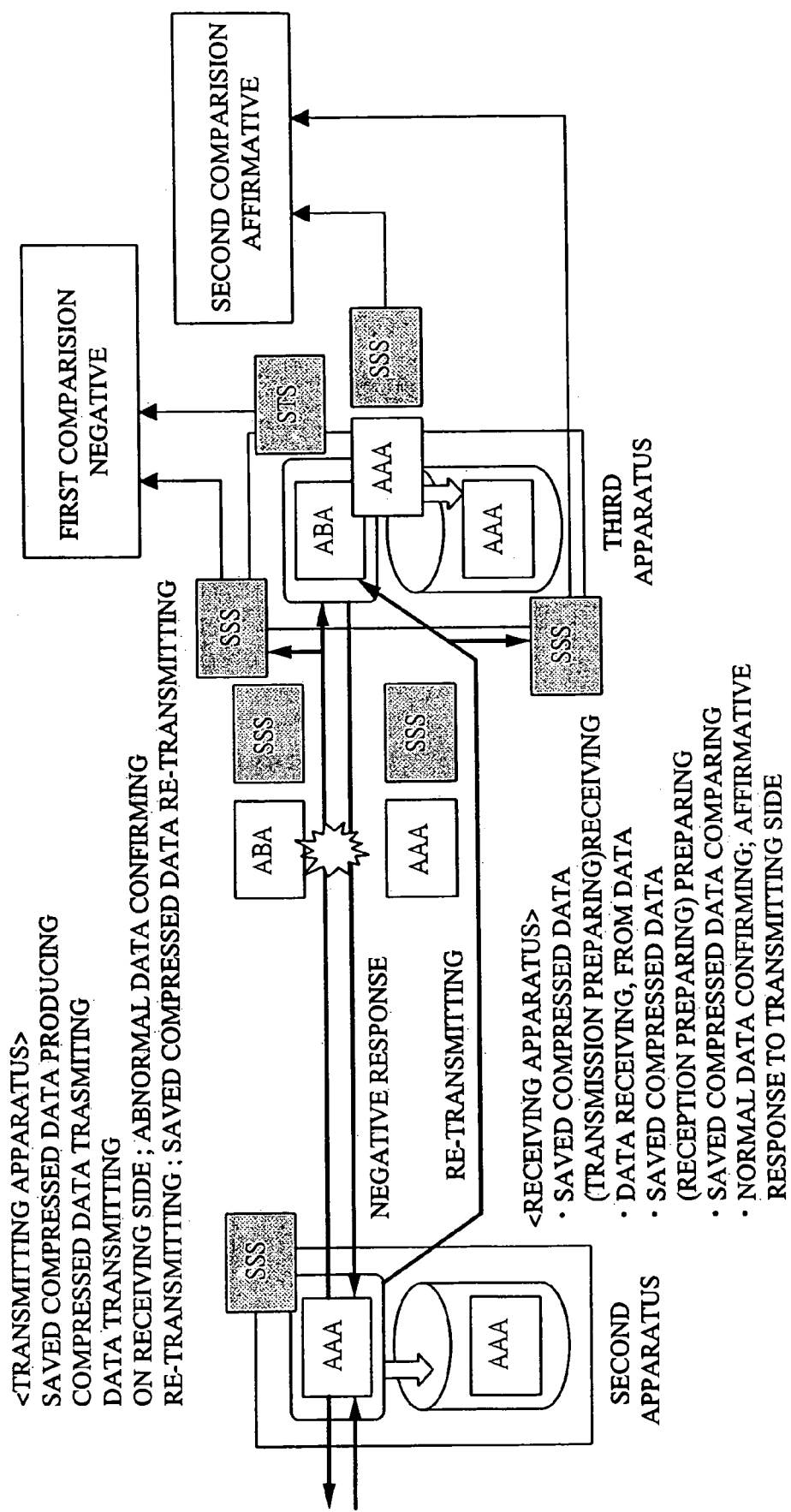
FIG. 17 is a diagram showing an operation when data falsifying or the like has occurred at a time of remote copying in the storage apparatus according to the third embodiment of the present invention.

An operation of the storage apparatus according to the third embodiment of the present invention at a remote copying time will be explained with reference to FIGS. 15 to 17. FIGS. 15 to 17 are explanatory diagrams for explaining an operation of the storage apparatus according to the third embodiment of the present invention at a remote copying time. FIG. 15 is a diagram showing data flow of remote copy using three storage apparatuses, FIG. 16 is a diagram showing an operation when data falsifying or the like has not occurred at a remote copying time, and FIG. 17 is a diagram showing an operation when data falsifying or the like has occurred at a remote copying time.

As shown in FIG. 15, first, the storage apparatus 10 is constituted of three apparatuses of a first apparatus, a second apparatus, and a third apparatus. Where the first apparatus is connected to the host computer 1, writing data from the host computer is stored in the first apparatus, data written in the first apparatus is transferred to the second apparatus and the third apparatus by remote copy and stored in the second apparatus and the third apparatus.

FIG. 15 is a diagram showing a case that, after a writing command from the host computer 1 is received in the first apparatus, an OK response is transmitted from the first apparatus to the host computer 1, reception of data of remote copy at the second apparatus is succeeded, and data is falsified in the course to the third apparatus.

In this case, generally, verify check is not performed on remote copy, but guarantee for communication path is implemented according to check SUM, LRC, or the like. However, when falsifying or camouflaging on a communication packet (a frame) is performed or idle data is inserted into the communication packet by a malicious third party, there is a case that, since an additional protective code (CRC or the like) is normal, data rigging can not be detected and a response from the third apparatus is an affirmative response.

In the embodiment, compressed data of writing data is transmitted to an apparatus to be transmitted with remote copy, and data set is then transmitted thereto. In the apparatus to be transmitted with the remote copy, compressed data of data received and the compressed data previously received are compared with each other and data rigging is detected. When data rigging is detected, such a fact is notified to the source apparatus and re-transmission is required by the apparatus to be transmitted with remote copy, so that normal data is received by the apparatus to be transmitted with remote copy.

Regarding remote copy from the first apparatus to the second apparatus, as shown in FIG. 16, for example, data "AAA" is written according to a writing command from the host computer 1 and compressed data "SSS" of the writing data is produced in the first apparatus serving as a transmitting apparatus, and the compressed data is transmitted to the second apparatus serving as a receiving apparatus.

In the transmission of the compressed data, content of the data is guaranteed owing to such a processing as encryption such that it can not be rigged. Such a processing as encryption can be performed while suppressing processing load, since a volume of the compressed data is small.

Thereafter, the data "AAA" is transmitted to the second apparatus, and the compressed data "SSS" from the first apparatus is received in the second apparatus, and the data "AAA" is then received therein.

In the second apparatus, compressed data "SSS" is produced from the received data "AAA", and it is compared with the compressed data received from the first apparatus. Since there is no data rigging in remote copy between the first apparatus and the second apparatus, it is confirmed from the comparison result that the received data is normal and an affirmative response is transmitted to the first apparatus on the transmitting side from the second apparatus.

In the first apparatus, it is confirmed according to the affirmative response from the second apparatus that the data is normal, data clear is performed. When remote copies for all data are completed, the processing for the remote copies is terminated.

Regarding remote copy from the second apparatus to the third apparatus, as shown in FIG. 17, data "AAA" of remote copy from the first apparatus is written and compressed data "SSS" of the writing data is produced in the second apparatus, and the compressed data is transmitted from the second apparatus to the third apparatus serving as a receiving apparatus.

Thereafter, the data "AAA" is transmitted to the third apparatus. At that time, the data is falsified so that data "ABA" is transmitted to the third apparatus instead of the data "AAA".

The compressed data "SSS" from the second apparatus is received by the third apparatus, and the falsified data "ABA" is then received thereby.

In the third apparatus, compressed data "STS" is produced from the received data "ABA" and it is compared with the compressed data received from the second apparatus. Since there is data rigging in the remote copy between the second apparatus and the third apparatus, it is confirmed from the comparison result that the data has been rigged, and negative response to the second apparatus on the transmitting side is performed in the third apparatus.

In the second apparatus, abnormality is confirmed according to the negative response from the third apparatus, and the compressed data "SSS" and the data "AAA" are re-transmitted to the third apparatus.

At a time of re-transmission, only the data may be re-transmitted without re-transmitting the compressed data.

In the third apparatus, the second comparison of the data re-transmitted and the compressed data is performed. Since data is not falsified in the re-transmission, it is confirmed as the re-comparison result that the data re-transmitted is normal, and an affirmative response is performed to the second apparatus on the transmitting side.

In the second apparatus, it is confirmed according to the affirmative response from the third apparatus that the re-transmitted data is normal, data clear is performed. When remote copies for all data are completed, the processing for the remote copies is terminated.

As described above, in the embodiment, it is made possible to detect data rigging to remote copy such as falsifying or camouflaging of data performed externally by transmitting compressed data to an apparatus to be transmitted with remote copy.

Fourth Embodiment

A fourth embodiment is constituted in the first embodiment such that compressed data of at least one generation to data at data writing times are saved in the compressed data saving unit 20 or the like, correction part is detected based upon the compressed data between the generations, a difference data in data corresponding to the correction part only is produced, the difference data is saved in relation to the compressed data, so that data before one generation can be restored.

A constitution of the storage apparatus of the fourth embodiment has a constitution similar to that of the first embodiment, and an operation of the former is similar to that of the latter except that compressed data of at least one generation is saved, a correction part is detected based upon the compressed data between the generations, difference data corresponding to only the correction data is produced.

[Operation for Restoring Data of Preceding Generation]

Figure 18:
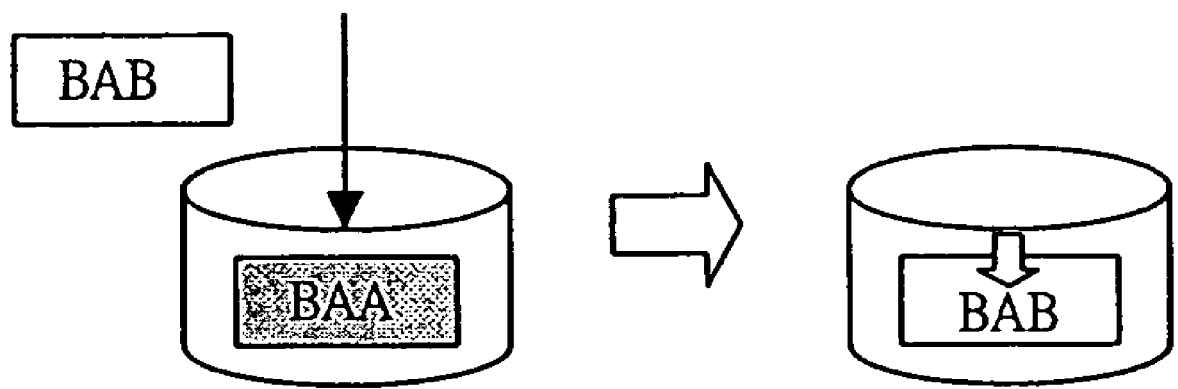
FIG. 18 is a diagram showing a state that error data has been written in a storage apparatus according to a fourth embodiment of the present invention.
Figure 19:
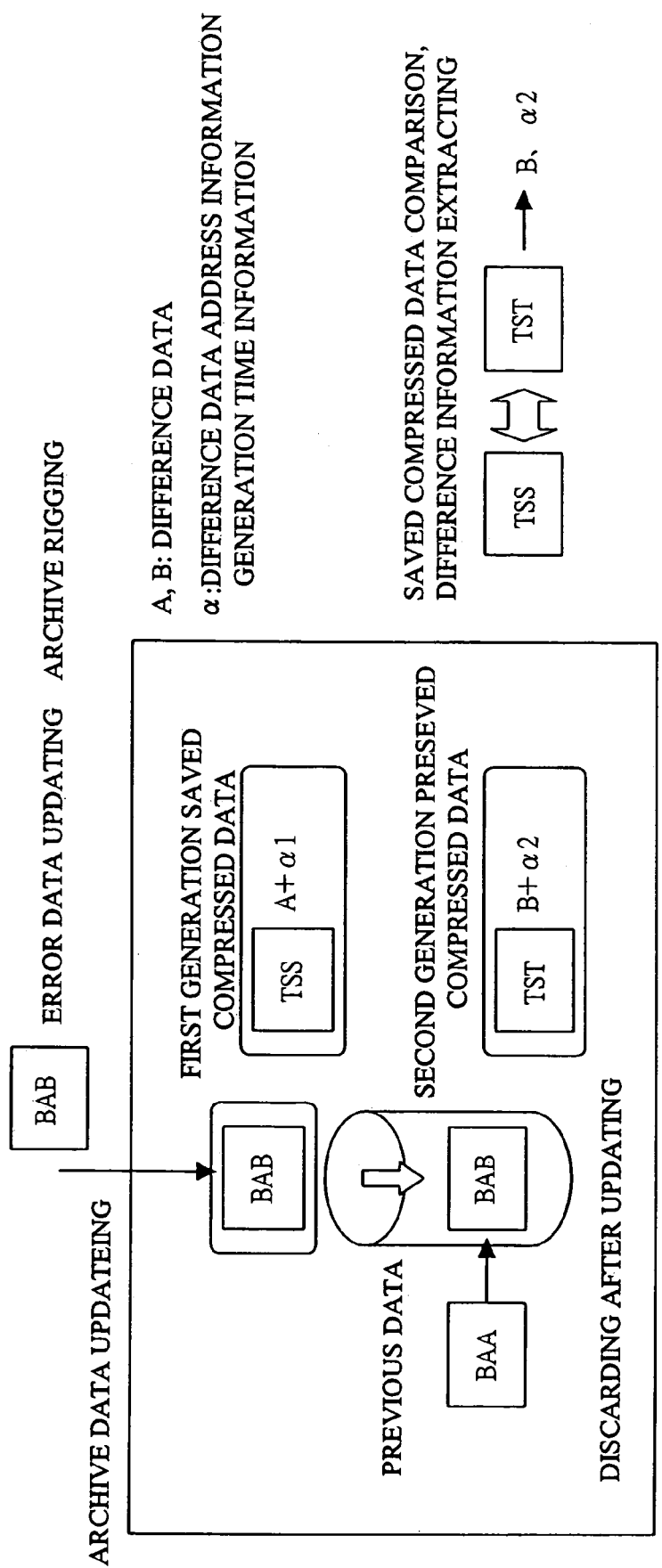
FIG. 19 is a diagram showing a state that compression data of second generation has been saved in the storage apparatus according to the fourth embodiment of the present invention.
Figure 20:
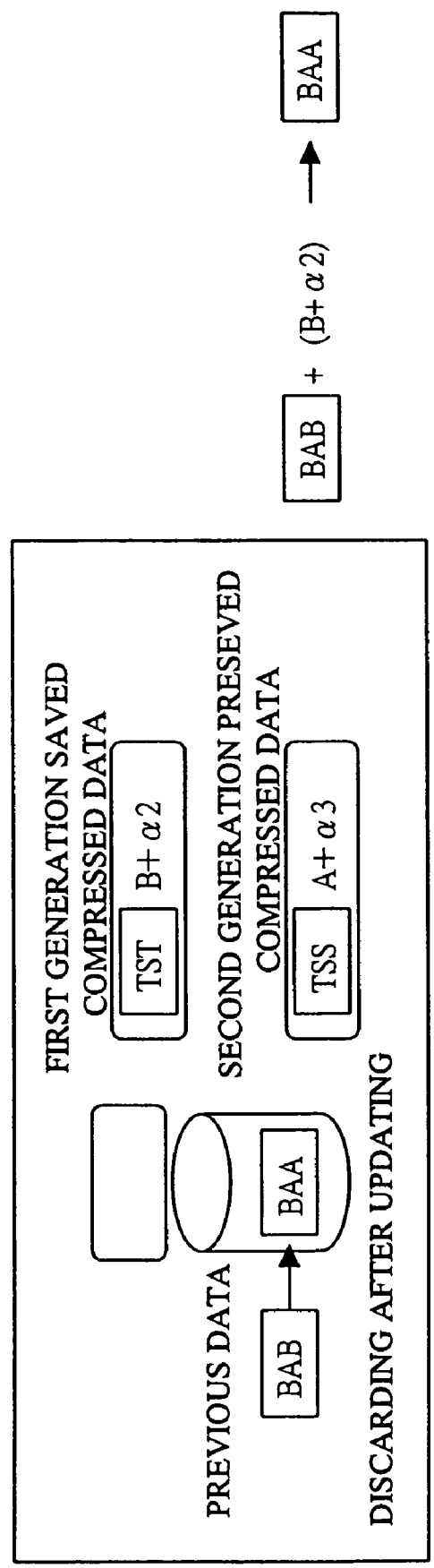
FIG. 20 is a diagram showing a state that data has been restored to its state before one generation in the storage apparatus according to the fourth embodiment of the present invention.

An operation for restoring data of the preceding generation in the storage apparatus according to the fourth embodiment of the present invention will be explained with reference to FIGS. 18 to 20. FIGS. 18 to 20 are explanatory diagrams for explaining an operation for restoring data of the preceding generation in the storage apparatus according to the fourth embodiment of the present invention. FIG. 18 is a diagram showing a state that error data has been written, FIG. 19 is a diagram showing a state that compressed data of two generations have been saved, and FIG. 20 is a diagram showing a state that restoration has been made to a state of the preceding generation.

In FIGS. 19 and 20, examples where compressed data are saved over two generations are shown.

As shown in FIG. 18, when a user writes data "BAB" erroneously in state that data "BAA" has been saved, the data "BAB" is written as it is, and when difference information is not saved, restoration to the data "BAA" can not be performed. However, when difference information about all data is managed for performing data restoration, much time is required for comparing data with each other in a processing for producing difference data.

Therefore, in the present invention, production of compressed data at a writing time is performed over at least one generation, and correction part of data is detected using the compressed data, and difference data is saved.

As shown in FIG. 19, when erroneous data "BAB" is written in the storage apparatus 10 from a state that data "BAA" has been saved, compressed data "TSS" at a time of the data "BAA" and difference data "A+α1" based upon the compressed data "TSS" and compressed data of data before the data "BAA" is written are saved as a first generation saving compressed data, and compressed data "TST" at a time of the current written data "BAB" and difference data "B+α2" based upon the compressed data "TST" and compressed data of data "BAA" before the data "BAB" is written are saved as a second generation saving compressed data.

Since the difference data allows confirmation of a correction part based upon comparison in compressed data between generations, for example, based upon the first generation compressed data "TSS" and the second generation compressed data "TST", it is possible to extract only difference data corresponding to the correction part. Therefore, it is unnecessary to perform comparison for all difference data so that a processing for difference data extraction can be conducted at a high speed.

When a user find erroneous data writing after he/she writes the data "BAB", as shown in FIG. 20, data restoration is performed by producing data "BAA" before the erroneous data "BAB" is written based upon the difference data "B+α2" saved in relation to the second generation compressed data and the currently written erroneous data "BAB".

After the data "BAA" is written, the compressed data "TST" and the difference data "B+α2" at a writing time of the data "BAB" are saved as the first generation saving compressed data, and the compressed data "TSS" of the restored data "BAA" and difference data "A+α3" based upon the compressed data "TSS" and the compressed data of the data "BAB" before the data "BAA" is written are saved as the second generation saving compressed data.

As described above, in the embodiment, since compressed data of at least one generation is saved and difference data based upon the compressed data is saved in relation to the compressed data, even if backup data is not saved, erroneous data can be restored to data before updating according to the compressed data and the difference data, after the erroneous data has been written.

Fifth Embodiment

A fifth embodiment is constituted in the first embodiment such that, when data is written duplicately, rigging to doubly written data is detected from compressed data.

A constitution of a storage apparatus of the fifth embodiment is similar to that of the first embodiment, and an operation of the former is similar to that of the latter except that, when data is written duplicately, rigging to doubly written data is detected based upon compressed data.

[Detection and Recovery when one of Doubly Written Data is Rigged]

Figure 21:
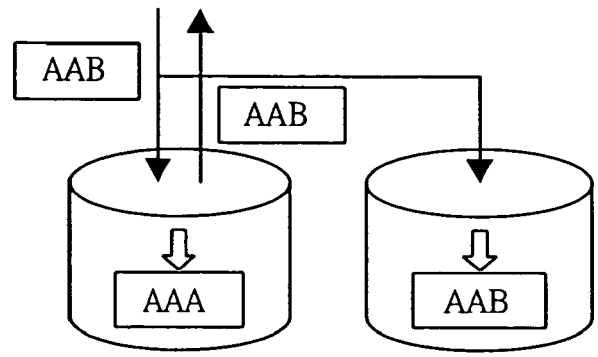
FIG. 21 is a diagram showing a state that one of data pieces written duplicately has been subjected to data rigging in the storage apparatus according to a fifth embodiment of the present invention.
Figure 22:
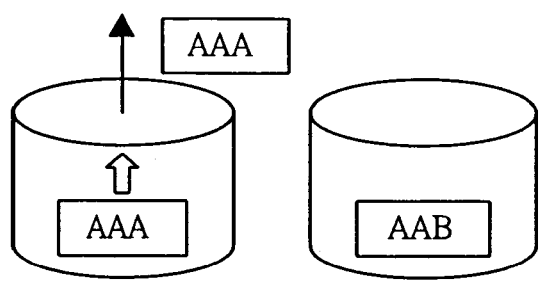
FIG. 22 is a diagram showing a case that double reading is not performed after data rigging in a storage apparatus according to the fifth embodiment of the present invention.

Detection and recovery when one of doubly written data is rigged in the storage apparatus according to the fifth embodiment of the present invention will be explained with reference to FIGS. 21 to 24. FIGS. 21 to 24 are explanatory diagrams for explaining detection and recovery when one of doubly written data is rigged in the storage apparatus according to the fifth embodiment of the present invention. FIG. 21 is a diagram showing a case that one of doubly written data has been rigged, FIG. 22 is a diagram showing a case that reading is not performed doubly after data rigging, FIG. 23 is a diagram showing a case that reading is performed doubly after data rigging, and FIG. 24 is a diagram showing an example that a device that has not been data-rigged is confirmed by double reading to correct data rigging.

As shown in FIG. 21, in a case that data is doubly written to a master side and a backup side, when data rigging is generated at the master side, writing data "AAB" to the master side is written as data "AAA", and a response that the writing itself is normal is returned back to the host computer 1, data rigging to the data at the master side that is ordinarily used can not be detected.

After doubly writing, as shown in FIG. 22, when only data at the master side is read without performing each reading, the data rigging can not be detected, and the rigged data is read as it is. After duplicative writing, as shown in FIG. 23, when data comparison is performed through double reading, data rigging can be detected by the comparison, but determination can not be made about which data at the master side and the backup side is correct.

Therefore, in the embodiment, compressed data of data to be doubly written is saved in the compressed data saving unit 20 or the like, and when one of data doubly written is data-rigged, the data rigging and which data is rigged of the data doubly written are detected based upon the compressed data, so that the data rigging is corrected to recover normal data.

As shown in FIG. 24, data rigging and correct data are detected by comparing compressed data "SST" corresponding to data "AAB" produced when data is written duplicately and saved in the compressed data saving unit 20 or the like, and compressed data "SSS" of rigged data "AAA" written in the master side and compressed data "SST" of data "AAB" written in the backup side with each other.

In the example shown in FIG. 24, in comparison with the compressed data "SST" saved in the compressed data saving unit 20 or the like, since the compressed data at the master side is "SSS" and the compressed data at the backup side is "SST", data rigging can be detected, and since the compressed data "SSS" at the master side is different from the compressed data "SST" saved in the compressed data saving unit 20 or the like, such a fact that the data at the master side is rigged data and the data at the backup side is correct data can be detected.

When correct data of the data at the master side and the backup side can be detected, it is made possible to correct data rigging at the duplicative writing time by producing recovery copy for correcting data rigging from the correct data.

In the embodiment, data rigging is detected at a reading time of data at the master side based upon compressed data of doubly written data without comparing data of doubly written data at the master side and the backup side like the first embodiment. When data rigging is detected, the data at the backup side is confirmed and when it is confirmed that the data at the backup side is correct, correction of the rigged data can be performed by producing recovery copy to the rigged data at the master side from the data at the backup side.

As described above, in the embodiment, when data is doubly written, compressed data of the writing data is saved and compressed data of respective data obtained by duplicative writing are compared with each other, so that data rigging at a duplicative writing time can be detected and correct one of data at the duplicative writing time can be detected.

As described above, though present invention which has been made by the present inventor has been specifically explained based upon the embodiments, it is not limited to the embodiments, and it may be modified variously without departing from the sprite and scope of the invention.

According to the present invention, an amount of data for detecting data rigging can be reduced. By providing a RAID constitution for producing a redundant parity code, data rigging detected can be corrected and the data rigged can be recovered to its original correct data.

Even data read after a long time elapses from writing of the data can be confirmed about its data reliability, and even data which has not been accessed after a long time elapses from writing of the data and which has currently been saved can be confirmed periodically regarding rigging thereto.

A function for monitoring data rigging to another device externally connected can be provided, and data can be restored by employing a redundant constitution in another device externally connected.

In the foregoing, the invention made by the inventor of the present invention has been concretely described based on the embodiments. However, it is needless to say that the present invention is not limited to the foregoing embodiments and various modifications and alterations can be made within the scope of the present invention.

What is claimed is:

1. A storage apparatus comprising:

a plurality of physical storing devices;

a plurality of host interface adapter units coupled to a host and to other storage apparatuses, and controlling data transfer between the host and the host interface adapter units, and controlling data transfer between the other storage apparatuses and the host interface adapter units, at least one of the other storage apparatuses using a Redundant Array of Inexpensive Disks (RAID) technique;

a disc interface adapter unit controlling data transfer between the disk interface adapter unit and the plurality of physical storing devices;

a cache memory unit storing data temporarily;

a switch unit coupled to the host interface adapter units, the disc interface adapter unit, and the cache memory unit;

a compressed data circuit unit creating, if the storage apparatus receives a write command sent from the host, a plurality of first compressed data corresponding to a plurality of first data to be transferred to the plurality of physical storing devices, the plurality of first data being transferred according to the RAID technique; and a compressed data saving unit storing the plurality of first compressed data created in the compressed data circuit unit, wherein, when the storage apparatus receives a first read command sent from the host after completion of a process of the write command sent from the host, the compressed data circuit creates a plurality of second compressed data based on the plurality of first data stored in the plurality of physical storing devices and corresponding to the first read command, and compares each of the plurality of first compressed data stored in the compressed data saving unit and one of the plurality of second compressed data to detect inconsistent data, wherein, if one of the plurality of first data is inconsistent data, consistent data corresponding to the one of the plurality of first data is restored according to the RAID technique, wherein the compressed data circuit unit creates a plurality of third compressed data corresponding to a plurality of second data to be transferred to the other storage apparatuses, the plurality of second data being transferred according to the RAID technique, wherein the compressed data saving unit storing the plurality of third compressed data created in the compressed data circuit unit, wherein, when the storage apparatus receives a second read command sent from the host, the compressed data circuit unit creates a plurality of fourth compressed data based on the plurality of second data stored in the other storage apparatuses and corresponding to the second read command, and compares each of the plurality of third compressed data stored in the compressed data saving unit and one of the plurality of fourth compressed data to detect the inconsistent data, and wherein, if one of the plurality of second data is the inconsistent data and if one of the other storage apparatuses storing the one of the plurality of second data uses the RAID technique, consistent data corresponding to the one of the plurality of second data is restored in the one of the other storage apparatuses.

2. The storage apparatus according to claim 1, wherein one of the plurality of first and second compressed data includes irreversible compressed data based upon one of the plurality of first data.

3. The storage apparatus according to claim 1, wherein one of the plurality of first and second compressed data includes irreversible compressed data created by performing an exclusive-OR operation on one of the plurality of first data for each plural byte.

4. The storage apparatus according to claim 1, wherein the compressed data saving unit is comprised of a non-volatile memory device or another physical storing device having a capacity smaller than that of one of the plurality of physical storing devices.

5. The storage apparatus according to claim 1, wherein the compressed data saving unit is coupled to the switch unit to store the plurality of first compressed data.

6. The storage apparatus according to claim 1, wherein the compressed data circuit unit is mounted in each of the host interface adapter units and the disc interface adapter unit.

7. A data control method for a storage apparatus, the storage apparatus being adapted to be coupled to a host and to other storage apparatuses and using a Redundant Array of Inexpensive Disks (RAID) technique, at least one of the other storage apparatuses also using the RAID technique, the data control method comprising:

creating, if the storage apparatus receives a write command sent from the host, a plurality of first compressed data corresponding to a plurality of first data to be transferred to a plurality of physical storing devices in the storage apparatus, the plurality of first data being transferred according to the RAID technique;

storing the created plurality of first compressed data in a compressed data saving unit;

when the storage apparatus receives a first read command sent from the host after completion of process of the write command sent from the host, creating a plurality of second compressed data based on the plurality of first data stored in the plurality of physical storing devices and corresponding to the first read command, and comparing each of the plurality of first compressed data stored in the compressed data saving unit and one of the plurality of second compressed data to detect inconsistent data;

if one of the plurality of first data is the inconsistent data, restoring consistent data corresponding to the one of the plurality of first data according to the RAID technique;

creating a plurality of third compressed data corresponding to a plurality of second data to be transferred to the other storage apparatuses, the plurality of second data being transferred according to the RAID technique;

storing the created plurality of third compressed data in a compressed data saving unit;

when the storage apparatus receives a second read command sent from the host, creating a plurality of fourth compressed data based on the plurality of second data stored in the other storage apparatuses and corresponding to the second read command, and comparing each of the plurality of third compressed data stored in the compressed data saving unit and one of the plurality of fourth compressed data to detect the inconsistent data; and if one of the plurality of second data is the inconsistent data and if one of the other storage apparatuses storing the one of the plurality of second data uses the RAID technique, controlling to restore consistent data corresponding to the one of the plurality of second data in the one of the other storage apparatuses.

8. The data control method according to claim 7,
wherein one of the plurality of first and second compressed data includes irreversible compressed data based upon one of the plurality of first data.

9. The data control method according to claim 7,
wherein one of the plurality of first and second compressed data includes irreversible compressed data created by performing an exclusive-OR operation on one of the plurality of first data for each plural byte.

10. A storage apparatus, the storage apparatus being adapted to be coupled to a host and to other storage apparatuses and using a Redundant Array of Inexpensive Disks (RAID) technique, at least one of the other storage apparatuses having the RAID function, the storage apparatus comprising:

a plurality of physical storing devices;

a compressed data circuit unit creating, if the storage apparatus receives a write command sent from the host, a plurality of first compressed data corresponding to a plurality of first data to be transferred to a plurality of physical storing devices, the plurality of first data being transferred to the plurality of physical storing devices according to the RAID technique; and a compressed data saving unit storing the created plurality of first compressed data, wherein, when the storage apparatus receives a first read command sent from the host after completion of process of the write command sent from the host, the compressed data circuit unit creates a plurality of second compressed data based on the plurality of first data stored in the plurality of physical storing devices and corresponding to the first read command, and compares each of the plurality of first compressed data stored in the compressed data saving unit and one of the plurality of second compressed data to detect inconsistent data, wherein, if one of the plurality of first data is the inconsistent data, consistent data corresponding to the one of the plurality of first data is restored according to the RAID technique, wherein the compressed data circuit unit creates a plurality of third compressed data corresponding to a plurality of second data to be transferred to the other storage apparatuses, the plurality of second data being transferred to the other storage apparatuses according to the RAID technique, wherein the compressed data saving unit stores the created plurality of third compressed data, when the storage apparatus receives a second read command sent from the host, the compressed data circuit unit creates a plurality of fourth compressed data based on the plurality of second data stored in the other storage apparatuses and corresponding to the second read command, and compares each of the plurality of third compressed data stored in the compressed data saving unit and one of the plurality of fourth compressed data to detect the inconsistent data, and if one of the plurality of second data is the inconsistent data and if one of the other storage apparatuses storing the one of the plurality of second data uses the RAID technique, consistent data corresponding to the one of the plurality of second data is restored in the one of the other storage apparatuses.

11. The storage apparatus according to claim 10,
wherein one of the plurality of first and second compressed data includes irreversible compressed data based upon one of the plurality of first data.

12. The storage apparatus according to claim 10,
wherein one of the plurality of first and second compressed data includes irreversible compressed data created by performing an exclusive-OR operation on one of the plurality of first data for each plural byte.

* * * * *